(12) United States Patent
Schoenberg et al.

(10) Patent No.: US 11,796,667 B2
(45) Date of Patent: Oct. 24, 2023

(54) ONE TO MANY RANGING TECHNIQUES

(71) Applicant: Apple Inc., Cupertino, CA (US)

(72) Inventors: Jonathan R. Schoenberg, Fishers, IN (US); Robert Golshan, Santa Clara, CA (US); Merrick K. McCracken, Sunnyvale, CA (US); Yagil Burowski, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 77 days.

(21) Appl. No.: 16/777,631

(22) Filed: Jan. 30, 2020

(65) Prior Publication Data
US 2021/0072373 A1 Mar. 11, 2021

Related U.S. Application Data

(60) Provisional application No. 62/931,647, filed on Nov. 6, 2019, provisional application No. 62/896,719, filed on Sep. 6, 2019.

(51) Int. Cl.
G01S 13/76 (2006.01)
G01S 13/87 (2006.01)

(52) U.S. Cl.
CPC .......... *G01S 13/765* (2013.01); *G01S 13/878* (2013.01)

(58) Field of Classification Search
CPC .............................. G01S 13/765; G01S 13/878
See application file for complete search history.

(56) References Cited

U.S. PATENT DOCUMENTS

| | | | |
|---|---|---|---|
| 9,439,039 B1 * | 9/2016 | Patil | H04W 4/023 |
| 9,538,321 B2 * | 1/2017 | Segev | H04W 4/023 |
| 9,974,040 B1 * | 5/2018 | Chu | H04L 67/1042 |
| 2017/0048904 A1 * | 2/2017 | Monaghan | H04B 7/15507 |
| 2018/0048742 A1 * | 2/2018 | Venkatesan | H04W 4/02 |
| 2019/0045540 A1 * | 2/2019 | Yoshimoto | H04W 72/1215 |
| 2019/0068271 A1 * | 2/2019 | Lou | H04B 7/0684 |
| 2019/0124654 A1 * | 4/2019 | Cherian | H04L 1/1854 |
| 2020/0068520 A1 * | 2/2020 | Marri Sridhar | H04W 8/005 |
| 2020/0225341 A1 * | 7/2020 | Li | G01S 13/765 |
| 2020/0366335 A1 * | 11/2020 | Lee | H04W 74/0875 |
| 2021/0211858 A1 * | 7/2021 | Ellenbeck | H04W 72/0466 |

* cited by examiner

*Primary Examiner* — Timothy A Brainard
*Assistant Examiner* — Ismaaeel A. Siddiquee
(74) *Attorney, Agent, or Firm* — KILPATRICK, TOWNSEND AND STOCKTON LLP

(57) ABSTRACT

A mobile device can include ranging circuitry to determine distance to another mobile device. A first wireless protocol can establish an initial communication session to perform authentication and/or exchange ranging settings. One mobile device acting as a beacon device can define a ranging round including an initial timeslot and a plurality of non-overlapping response slots for discovering and performing ranging with any mobile device in a vicinity of the beacon. The beacon can broadcast a ranging request including a beacon device identifier at a request time. A first mobile device can transmit a first acknowledgement message during a first response slot. A second mobile device can transmit a second acknowledgement message during a second response slot. The beacon device can calculate a first distance from the first mobile device and a second distance from the second mobile device based at least upon information in the first and second acknowledgement messages.

26 Claims, 14 Drawing Sheets

ONE TO MANY RANGING TECHNIQUES

CROSS-REFERENCES TO RELATED APPLICATIONS

This application claims the benefit of U.S. Provisional Patent Application No. 62/896,719, filed Sep. 6, 2019, and U.S. Provisional Patent Application No. 62/931,647, filed Nov. 6, 2019, which are hereby incorporated by reference in their entirety and for all purposes.

BACKGROUND

Mobile devices (e.g., smart phone) can store a variety of content and perform a variety of functions. Users typically carry a smartphone wherever they go and have it readily available. But, in today's hectic world, users have increasing demands on such mobile devices to make their lives easier and more productive. Accordingly, it is desirable to provide improved functionality in mobile devices (e.g., determining range from one or more electronic devices).

Techniques for determining range between electronic devices using one-to-one communications is inefficient. These techniques are complicated because the internal clocks of various electronic devices are not synchronized with each other. In some circumstances, a beacon may provide information concerning the local environment that can be provided to multiple electronic devices. In some cases, users with electronic devices are trying to obtain their range and/or angular measurements from a beacon. In cases with a single beacon and multiple receiving devices, communicating in the same bandwidth can result in collisions between the data packets. The collisions can result in missed ranging measurements. It can been advantageous for a technique to allow account for these potential collisions in implementing techniques for efficient ranging techniques.

BRIEF SUMMARY

Certain embodiments are directed to techniques (e.g., a device, a method, a memory or non-transitory computer readable medium storing code or instructions executable by one or more processors) for one to many ranging techniques.

In some embodiments, a mobile device can include ranging circuitry that can determine the relative distance between the mobile device and another mobile device. For example, time of flight measurements can be performed using ultra-wideband (UWB) pulses transmitted between the mobile devices. The ranging can provide distance information, which can be used to determine a relative position of one mobile device to another. As examples, the relative position can include a distance value, angular (orientation) information between the two devices, or both.

In various embodiments, a mobile device can function as a beacon device. The beacon device can define a ranging round by determining time periods for an initial timeslot and a plurality of non-overlapping response slots. The non-overlapping response slots can be used for discovering and performing ranging with one or more participating mobile devices in a vicinity of the beacon device. The beacon can broadcast a ranging request message to be received by the other mobile devices. The ranging request message can include a beacon device identifier. A first mobile device can select a time slot of the plurality of non-overlapping response slots. The selection can be made randomly or pseudo randomly. The first mobile device can transmit a first acknowledgement message during the selected response slot. A second mobile device can transmit a second acknowledgement message during a second response slot. The beacon device can calculate a first distance from the first mobile device and a second distance from the second mobile device based at least upon information in the first and second acknowledgement messages.

The ranging functionality can be implemented in combination with another wireless protocol, which can establish an initial communication session, e.g., to perform authentication and/or exchange ranging settings. Additional wireless protocols can also be used, e.g., for transmission of content from one device to the other. For instance, a video or audio file can be transferred from one device to the other after ranging has been performed.

These and other embodiments of the invention are described in detail below. For example, other embodiments are directed to systems, devices, and computer readable media associated with methods described herein.

A better understanding of the nature and advantages of embodiments of the present invention may be gained with reference to the following detailed description and the accompanying drawings.

DETAILED DESCRIPTION

Figure 1:
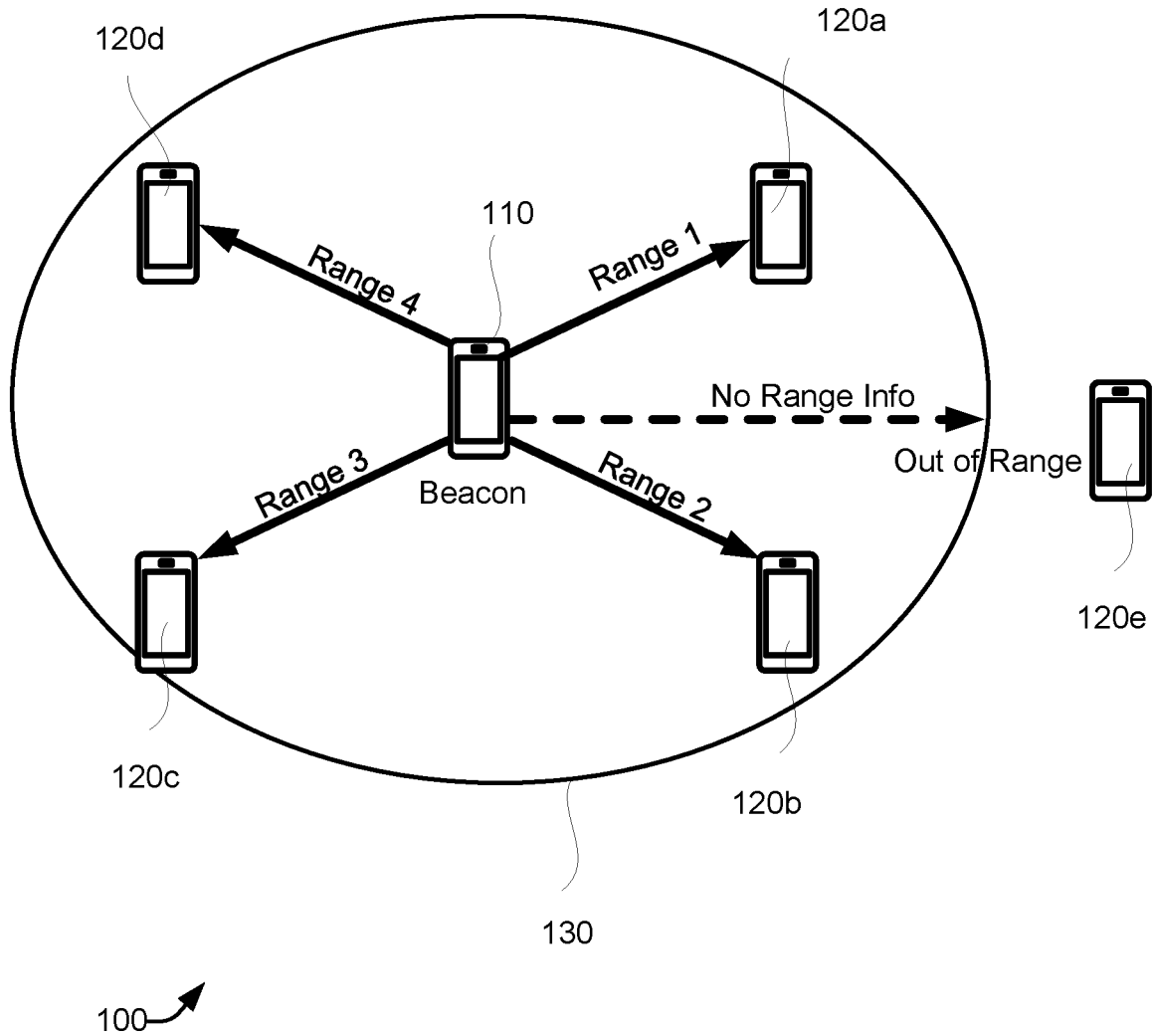
FIG. 1 illustrates schematically an example of one-to-many ranging techniques involving a primary device and multiple secondary devices.

Certain embodiments are directed to techniques (e.g., a device, a method, a memory or non-transitory computer readable medium storing code or instructions executable by one or more processors) for one to many ranging techniques.

Mobile devices may use GPS or other location circuitry to determine the location of the mobile device. For example, a map application can show an approximate location of the mobile device on a map. However, such techniques for determining location are typically determined relative to some external reference frame that is fixed, and not to a variable reference frame, e.g., another mobile device.

In some embodiments, a mobile device can include ranging circuitry that can determine the relative distance between the mobile device and another mobile device. For example, time of flight measurements can be performed using ultra-wideband (UWB) pulses transmitted between the mobile devices. The ranging can provide distance information, which can be used to determine a relative position of one mobile device to another. As examples, the relative position can include a distance value, angular (orientation) information between the two devices, or both.

Techniques disclosed herein can overcome challenges associated with synchronization of clocks for conducting ranging between electronic devices. For one to many ranging techniques, a mobile device can function as a beacon device. The beacon device can define parameters for a ranging round by determining time periods for an initial timeslot and a plurality of non-overlapping response slots. The non-overlapping response slots can be used for discovering and performing ranging with one or more participating mobile devices in a vicinity of the beacon device. The beacon can broadcast a ranging request message containing the parameters to be used during the ranging session to be received by the other mobile devices. Each of the other mobile devices can select and conduct a ranging session during one of the non-overlapping time slots. If ranging messages are missed, the devices can repeat the ranging session during a later time period. The beacon can use the response messages sent by the other mobile devices to determine a distance between the devices. This distance can also be shared to the other mobile devices. The ranging session can be repeated several times as required.

The ranging functionality can be implemented in combination with another wireless protocol, which can establish an initial communication session, e.g., to perform authentication and/or exchange ranging settings. Additional wireless protocols can also be used, e.g., for transmission of content from one device to the other. For instance, a video or audio file can be transferred from one device to the other after ranging has been performed.

The distance information obtained from the ranging session can be used in a variety of ways. For example, the distance information can be used to display a relative position of the receiving mobile device on a screen of a sending mobile device, which is to send a data item. Such a user interface can allow a user to quickly and accurately select the recipient device for sending the data item, e.g., a video, audio, or a link to an application, as may be used to hand off an application at a particular location (e.g., page) in an application.

I. Introduction to One to Many Scenario

Ranging techniques that require one-to-one communications are inefficient because of the power and time required to for separate communications for multiple devices. The disclosed techniques allow for ranging of multiple devices using a single beacon device. As examples, the beacon device can comprise a smartphone, a tablet, a wearable device, a laptop, or a portable electronic device.

FIG. 1 illustrates a one-to-many communication group 100 involving a primary device (referred to as a beacon) 110 and multiple secondary devices 120a-120e. The primary device 110 may send signals to the secondary devices 120a-120e to facilitate communication ranging sessions. Global navigation satellite systems (GNSS) signals, such as the global positioning system (GPS) signals, can be an important aspect of device-to-device (D2D) communications, as it may be important for the secondary devices 120 to know the exact location of the primary device 110 and the exact time when the primary device 110 broadcast a message. For example, in case of an emergency, the primary device 110 may broadcast an emergency message to all secondary devices 120 within a communication range of the primary device 110 (e.g., within the circle 130 around the primary device 110; note that the secondary device 120e may be out of the communication range of the primary device 110 as it may be too far from the primary device 110).

A secondary device 120 receiving the emergency message may need to know the location of the primary device 110 in order to provide help. The secondary device 120 may also need to know the time when the emergency message was sent, e.g., in order to determine whether the emergency message is still relevant, to determine whether the transmitting device may have moved, etc. The position information and timing information can be important in other situations. The primary device 110 may maintain position fixes (e.g., in terms of longitude and latitude) and time through satellite signals. The secondary devices may not have position fixes directly through satellite signals.

The communications between the devices can be implemented using frames. A frame can refer to a digital data transmission unit in computer networking and telecommunication. A frame typically includes one or more frame synchronization features comprising a sequence of bits or symbols that indicate to the receiver the beginning and end of the payload data within the stream of symbols or bits it receives.

In some embodiments, a mobile device can include circuitry for performing ranging measurements. Such circuitry can include one or more dedicated antennas (e.g., 3) and circuitry for processing measured signals. The ranging measurements can be performed using the time-of-flight of pulses between the two mobile devices. In some implementations, a round-trip time (RTT) is used to determine distance information, e.g., for each of the antennas. In other implementations, a single-trip time in one direction can be used. The pulses may be formed using ultra-wideband (UWB) radio technology. Ranging techniques between multiple devices can be challenging due to scheduling the transmission of ranging request messages, response messages, and acknowledgement messages on the same channel so that collisions between these messages are minimized or avoided. These techniques can be better understood with a brief explanation of ranging techniques for mobile device.

II. Ranging

In some embodiments, a mobile device can include circuitry for performing ranging measurements. Such circuitry can include one or more dedicated antennas (e.g., 3) and circuitry for processing measured signals. The ranging measurements can be performed using the time-of-flight of pulses between the two mobile devices. In some implementations, a round-trip time (RTT) is used to determine distance information, e.g., for each of the antennas. In other implementations, a single-trip time in one direction can be used. The pulses may be formed using ultra-wideband (UWB) radio technology.

A. Sequence Diagram

Figure 2:
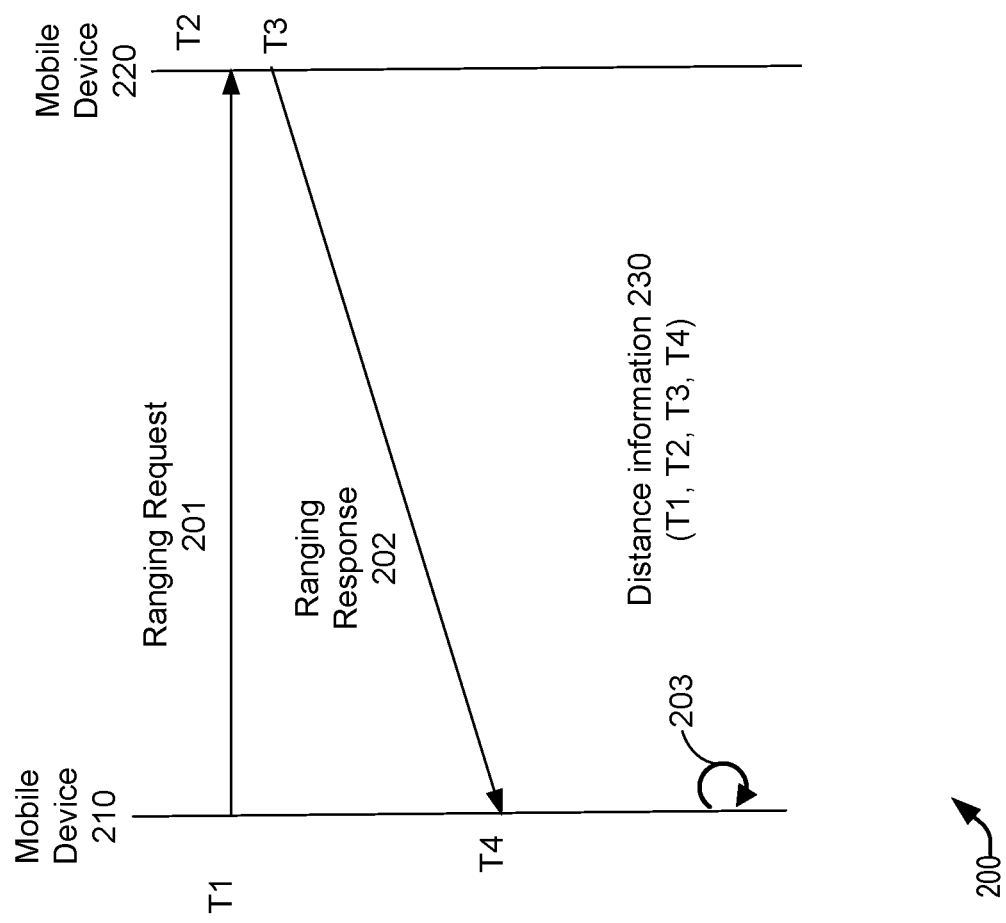
FIG. 2 shows a sequence diagram for performing a ranging measurement between two mobile devices according to embodiments of the present disclosure.

FIG. 2 shows a sequence diagram 200 for performing a ranging measurement between two mobile devices according to embodiments of the present disclosure. The two mobile devices may belong to two different users. The two users may know each other, and thus have each other's phone numbers or other identifiers. As described in more detail later, such an identifier can be used for authentication purposes, e.g., so ranging is not performed with unknown devices. Although FIG. 2 shows a single measurement, the process can be repeated to perform multiple measurements over a time interval as part of a ranging session, where such measurements can be averaged or otherwise analyzed to provide a single distance value, e.g., for each antenna.

A first mobile device 210 (e.g., a smartphone) can initiate a ranging measurement (operation) by transmitting a ranging request 201 to a second mobile device 220. Ranging request 201 can include a first set of one or more pulses. The ranging measurement can be performed using a ranging wireless protocol (e.g., UWB). The ranging measurement may be triggered in various ways, e.g., based on user input and/or authentication using another wireless protocol, e.g., Bluetooth low energy (BLE).

At T1, the first mobile device 210 transmits ranging request 201. At T2, the second mobile device 220 receives ranging request 201. T2 can be an average received time when multiple pulses are in the first set. The second mobile device 220 can be expecting the ranging request 201 within a time window based on previous communications, e.g., using another wireless protocol. The ranging wireless protocol and the another wireless protocol can be synchronized so that mobile device 220 can turn on the ranging antenna(s) and associated circuitry for a specified time window, as opposed to leaving them on for an entire ranging session.

In response to receiving the ranging request 201, mobile device 220 can transmit ranging response 202. As shown, ranging response 202 is transmitted at time T3, e.g., a transmitted time of a pulse or an average transmission time for a set of pulses. T2 and T3 may also be a set of times for respective pulses. Ranging response 202 can include times T2 and T3 so that mobile device 210 can compute distance information. As an alternative, a delta between the two times (e.g., T3-T2) can be sent. The ranging response 202 can also include an identifier for the first mobile device 210, an identifier for the second mobile device 220, or both.

At T4, the first mobile device 210 can receive ranging response 202. Like the other times, T4 can be a single time value or a set of time values.

At 203, the first mobile device 210 computes distance information 230, which can have various units, such as distance units (e.g., meters) or as a time (e.g., milliseconds). Time can be equivalent to a distance with a proportionality factor corresponding to the speed of light. In some embodiments, a distance can be computed from a total round-trip time, which may equal T2-T1+T4-T3. In some embodiments, the processing time for the second mobile device 220 can also be subtracted from the total round-trip time. More complex calculations can also be used, e.g., when the times correspond to sets of times for sets of pulses and when a frequency correction is implemented.

B. Triangulation

In some embodiments, a mobile device can have multiple antennas, e.g., to perform triangulation. The separate measurements from different antennas can be used to determine a two-dimensional (2D) position, as opposed to a single distance value that could result from anywhere on a circle/sphere around the mobile device. The two-dimensional (2D) position can be specified in various coordinates, e.g., Cartesian or polar, where polar coordinates can comprise an angular value and a radial value.

Figure 3:
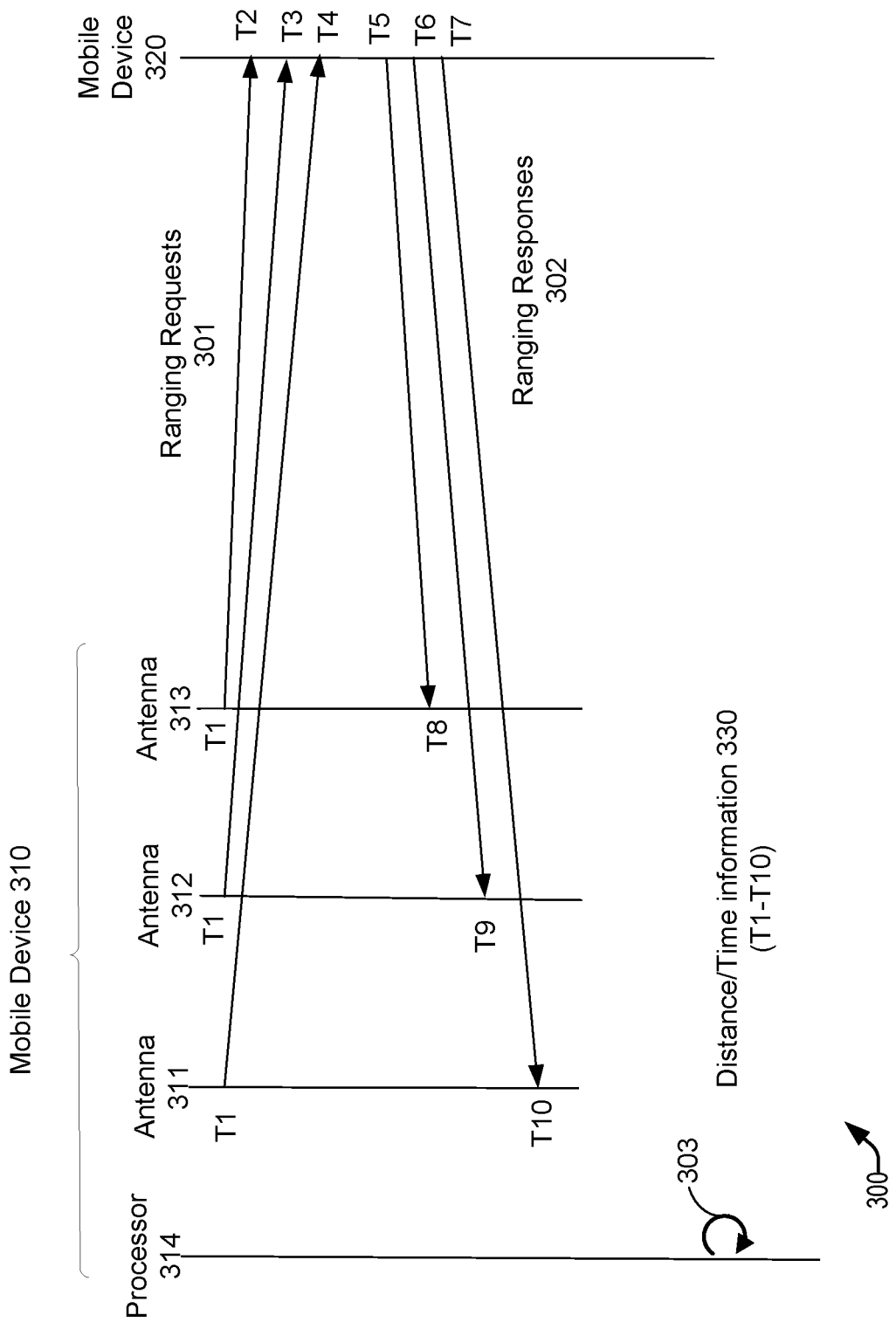
FIG. 3 illustrates an exemplary ranging exchange between a beacon and one or more computing devices.

FIG. 3 shows a sequence diagram 300 of a ranging operation involving a mobile device 310 having three antennas 311, 312, and 313 according to embodiments of the present disclosure. Antennas 311, 312, 313 can be arranged to have different orientations, e.g., to define a field of view for performing ranging measurements.

In this example of FIG. 3, each of antennas 311, 312, 313 transmits a packet (including one or more pulses) that is received by mobile device 320. These packets can be part of ranging requests 301. The packets can each be transmitted at time T1, although they can be transmitted at different times in other implementations.

In some embodiments, mobile device 320 can have multiple antennas itself. In such an implementation, an antenna of mobile device 310 can send a packet to a particular antenna (as opposed to a broadcast) of mobile device 320, which can respond to that particular packet. Mobile device 320 can listen at a specified antenna so that both devices know which antennas are involved, or a packet can indicate which antenna a message is for. For example, a first antenna can respond to a received packet; and once the response is received, another packet can be sent to a different antenna. Such an alternative procedure may take more time and power.

The three packets of ranging requests 301 are received at times T2, T3, and T4, respectively. Thus, the antenna(s) (e.g., UWB antennas) of mobile device 320 can listen at substantially the same time and respond independently. Mobile device 320 provides ranging responses 302, which are sent at times T5, T6, and T7, respectively. Mobile device 310 receives the ranging responses at times T8, T9, and T10, respectively.

At 303, processor 314 of mobile device 310 computes distance information 330, e.g., as described herein. Processor 314 can receive the times from the antennas and more specifically from circuitry (e.g., UWB circuitry), that analyzes signals from antennas 311, 312, 313. As described later, processor 314 can be an always-on processor that uses less power than an application processor that can perform functionality that is more general. Distance information 330 can be used to determine a 2D or 3D position of mobile device 320, where such position can be used to configure a display screen of mobile device 310. For instance, the position can be used to determine where to display an icon corresponding to mobile device 320, e.g., which position in a list, which position in a 2D grid, or in which cluster of 1D, 2D, or 3D distance/position ranges to display the icon.

In some embodiments, to determine which ranging response is from which antenna, mobile device 320 can inform mobile device 310 of the order of response messages that are to be sent, e.g., during a ranging setup handshake, which may occur using another wireless protocol. In other embodiments, the ranging responses can include identifiers, which indicate which antenna sent the message. These identifiers can be negotiated in a ranging setup handshake.

Messages in ranging requests 301 and ranging responses 302 can include very little data in the payload, e.g., by including few pulses. Using few pulses can be advantageous. The environment of a mobile device (potentially in a pocket) can make measurements difficult. As another example, an antenna of one device might face a different direction than the direction from which the other device is approaching. Thus, it is desirable to use high power for each pulse, but there are government restrictions (as well as battery concerns) on how much power can be used within a specified time window (e.g., averaged over one millisecond). The packet frames in these messages can be about 150 to 180 microseconds long.

C. UWB

The wireless protocol used for ranging can have a narrower pulse (e.g., a narrower full width at half maximum (FWHM)) than a first wireless protocol (e.g., Bluetooth) used for initial authentication or communication of ranging settings. In some implementations, the ranging wireless protocol (e.g., UWB) can provide distance accuracy of 5 cm or better. In various embodiments, the frequency range can be between 3.1 to 10.6 Gigahertz (GHz). Multiple channels can be used, e.g., one channel at 6.5 GHz another channel at 8 GHz. Thus, in some instances, the ranging wireless protocol does not overlap with the frequency range of the first wireless protocol (e.g., 2.4 to 2.485 GHz).

The ranging wireless protocol can be specified by IEEE 802.15.4, which is a type of UWB. Each pulse in a pulse-based UWB system can occupy the entire UWB bandwidth (e.g., 500 MHz), thereby allowing the pulse to be localized in time (i.e., narrow width in time, e.g., 0.5 ns to a few nanoseconds). In terms of distance, pulses can be less than 60 cm wide for a 500 MHz-wide pulse and less than 23 cm for a 1.3 GHz-bandwidth pulse. Because the bandwidth is so wide and width in real space is so narrow, very precise time-of-flight measurements can be obtained.

Each one of ranging messages (also referred to as frames or packets) can include a sequence of pulses, which can represent information that is modulated. Each data symbol in a frame can be a sequence. The packets can have a preamble that includes header information, e.g., of a physical layer and a media access control (MAC) layer, and may include a destination address. In some implementations, a packet frame can include a synchronization part and a start frame delimiter, which can line up timing.

A packet can include how security is configured and include encrypted information, e.g., an identifier of which antenna sent the packet. The encrypted information can be used for further authentication. However, for a ranging operation, the content of the data may not need to be determined. In some embodiments, a timestamp for a pulse of a particular piece of data can be used to track a difference between transmission and reception. Content (e.g., decrypted content) can be used to match pulses so that the correct differences in times can be computed. In some implementations, the encrypted information can include an indicator that authenticates which stage the message corresponds, e.g., ranging requests 301 can correspond to stage 1 and ranging responses 302 can correspond to stage 2. Such use of an indicator may be helpful when more than two devices are performing ranging operations in near each other.

The narrow pulses (e.g., ~one nanosecond width) can be used to accurately determine a distance. The high bandwidth (e.g., 500 MHz of spectrum) allows the narrow pulse and accurate location determination. A cross correlation of the pulses can provide a timing accuracy that is a small fraction of the width of a pulse, e.g., providing accuracy within hundreds or tens of picoseconds, which provides a sub-meter level of ranging accuracy. The pulses can represent a ranging waveform of plus 1's and minus 1's in some pattern that is recognized by a receiver. The distance measurement can use a round trip time measurement, also referred to as a time-of-flight measurement. As described above, the mobile device can send a set of timestamps, which can remove a necessity of clock synchronization between the two devices.

III. Setup and Ranging Using Two Protocols

In some embodiments, two wireless protocols can be used. An authentication and setup phase can be implemented using a first wireless protocol (e.g., Bluetooth Low Energy (BLE) or other Bluetooth). A second (ranging) wireless protocol can be used to perform ranging measurements. Accordingly, a first wireless protocol link between a mobile device (e.g., a phone, tablet, or a watch) and another mobile device can be used for authentication, and then used to initiate and control a second wireless protocol (e.g., UWB) for ranging and exchange of distance information. For example, the first wireless protocol can provide a low power framework to negotiate security keys, ranging intervals, and to initiate ranging over UWB.

A. Flowchart

Figure 4:
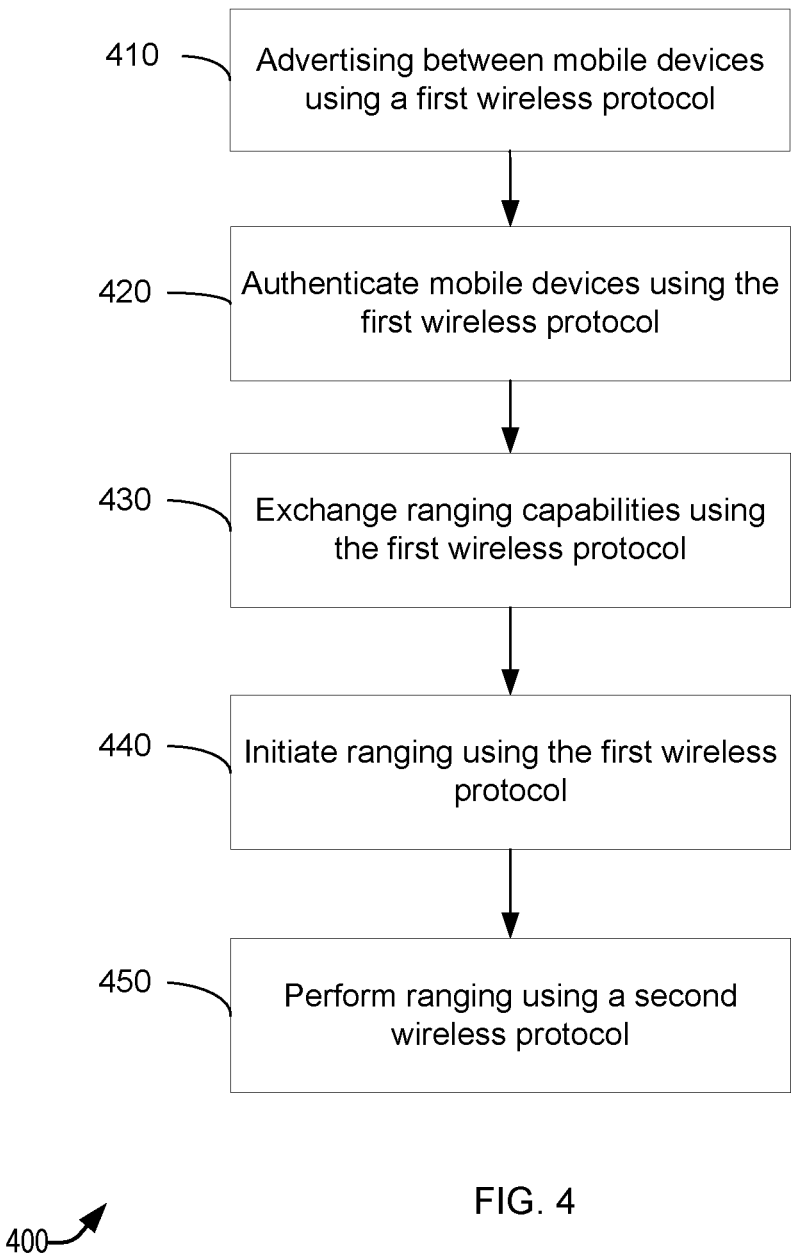
FIG. 4 is a flowchart illustrating a method for performing, by a first (sending) mobile device, a ranging operation with a second (receiving) mobile device involving two wireless protocols according to embodiments of the present disclosure.

FIG. 4 is a flowchart illustrating a method 400 for performing, by a first (sending) mobile device, a ranging operation with a second (receiving) mobile device involving two wireless protocols according to embodiments of the present disclosure. A first wireless protocol (e.g., Bluetooth) can be used for authentication, and a second wireless protocol (e.g., UWB) can be used for a ranging measurement.

At block 410, the mobile devices communicate advertisements using a first wireless protocol, e.g., BLE. A mobile device can transmit advertisements at a particular rate, and scan for advertisements from other mobile devices at a particular rate. The advertisements can include an authorization tag for each of the mobile devices to authenticate each other, e.g., to confirm that they have been registered with a third party, such as a manufacturer of the mobile devise. Such a third party (also called an authentication server) can generate the authentication tag using an identifier from the mobile device (or from a user of the mobile device) and provide to the mobile device, which can then transmit the authentication tag in an advertisement. As an example, an authentication tag can be generated using a hash function.

As examples, an identifier that is the authentication tag or is used to generate the authentication tag can include an identity address (e.g., media access control (MAC) address). For example, a unique 48-bit address can be used for each mobile device. An authentication tag can be updated periodically. Advertisements can also include an identifier (ID) associated with the authentication tag (e.g., to retrieve additional information, such as a public certificate) and one or more commands, e.g., for a receiving mobile device to wake up.

At block 420, the mobile devices are authenticated using the first wireless protocol. For example, the receiving mobile device can detect an advertisement and obtain an authentication tag. The authentication tag can be compared to a list of authentication tags stored on the mobile device, e.g., corresponding to a contact list. When a mobile device adds a contact, the corresponding authentication tag can be obtained from an authentication server. The mobile device can then detect when an advertisement includes an authentication tag already stored on the mobile device. In some implementations, a new authentication tag can be sent to the authentication server to confirm that an identifier and an authentication tag match.

In response to authentication by the receiving mobile device or generally as an advertising mode, the receiving mobile device can also send an advertisement that includes an authentication tag. In other embodiments, authentication is not performed.

As part of the communication using the first wireless protocol, a secure communication channel can be established so that messages can be encrypted. For example, the communication can result in a shared secret being saved on both devices, where the shared secret can be used for future authentications (e.g., via a challenge response) and/or encryption of messages between the mobile devices.

At block 430, the mobile devices can exchange ranging capabilities (settings) using the first wireless protocol. The exchange of ranging capabilities can ensure that the signaling between mobile devices is performed in a consistent manner by both devices. Such exchange can allow the mobile device to adapt to different devices, e.g., ones with different numbers and types of antenna units. Example ranging capabilities can include specifying a format for ranging messages between the mobile devices, a frequency range to use, a number of antenna units for each device, and encryption protocols for ranging messages using the second wireless protocol.

At block 440, ranging can be initiated using the first wireless protocol. In some implementations, the initiation can be started by a ranging request message sent from a sending mobile device. The responding device can respond with a start notification event (message). Once the start notification event occurs, ranging can be performed using a second wireless protocol, e.g., by turning on corresponding radios within a specified time of receiving the start message. Such coordination between the first and second wireless protocols can synchronize the devices such that antenna(s) of the second protocol do not have to be on all the time, thereby saving power.

At block 450, ranging can be performed using a second wireless protocol (e.g., UWB). After the initiation signals using the first wireless protocol, the receiving device can begin scanning for ranging signals at a specified time using one or more antennas corresponding to the second wireless protocol. The one or more antennas can receive one or more ranging request messages and send one or more ranging response messages.

Circuitry of the receiving device can perform various levels of processing of such ranging messages, e.g., to determine time stamps. The sending device can receive the ranging response messages and determine time stamps for the transmission of the one or more ranging request messages and time stamps for the one or more ranging response messages, e.g., as shown in FIGS. 1 and 2. The sending device can use the times to determine a distance between the mobile devices. The ranging can be performed once, a specified number of times, or continue until a stop ranging request is processed.

A mobile device may have multiple antennas for the first wireless protocol (e.g., various forms of Bluetooth (BT), such as BLE). BT can use short-wavelength ultra-high frequency (UHF) radio waves in the ISM band from 2.4 to 2.485 GHz. Certain modes of the first wireless protocol can be used over a relatively long range. For example, one BT radio can increase a communication range by using a lower packet coding of 125 kbps or 500 kbps and by increasing a maximum transmission power (e.g., to +20 decibel-milliwatts (dBm)). Such a radio can be used for both advertising and data packets and provide range up to 100 meters, as opposed to a lower power mode that may work only up to 20 meters.

But, these packets can be roughly 2 to 8 times longer duration, e.g., up to about 16 milliseconds, which does not make them suitable for ranging. A one-microsecond pulse provides a range that is +/−300 meters. In addition, even regular power modes for BT provide pulses that are not suitable for ranging.

B. Sequence Diagram

Figure 5:
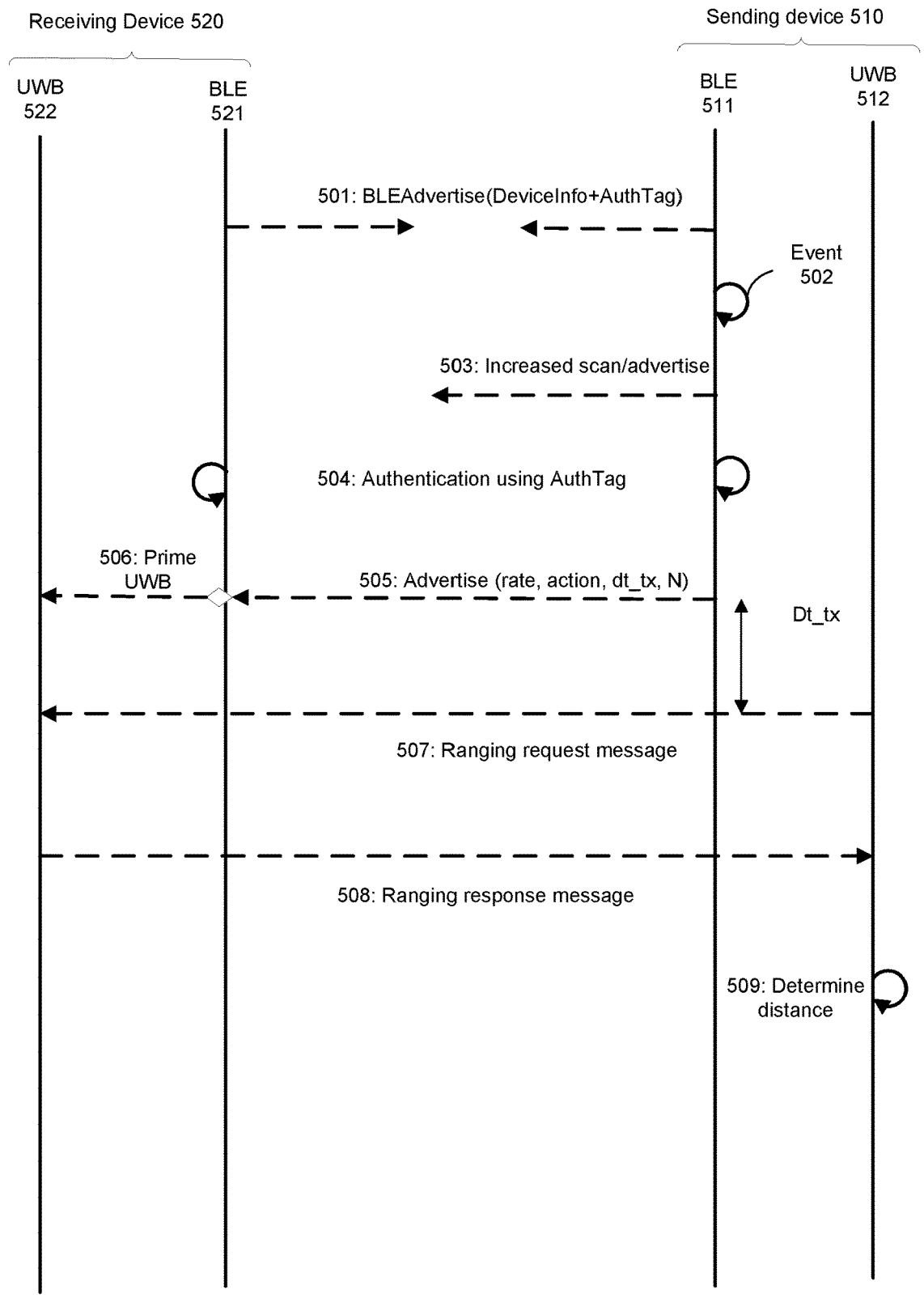
FIG. 5 shows a sequence diagram of communications between a sending device and a receiving device involving BLE and UWB protocols according to embodiments of the present disclosure.

FIG. 5 shows a sequence diagram 500 of communications between a sending device 510 and a receiving device 520 involving BT and UWB protocols according to embodiments of the present disclosure. The mobile devices can be in a screen off state or be actively in use by a user. Certain steps of the sequence diagram may be optional.

At 501, a BLE antenna 511 of sending device 510 transmits an advertisement signal, and BLE antenna 521 transmits an advertisement signal. The devices can broadcast advertisement signals at a specified duty cycle, without the user having to provide any user input. As shown, the advertisement signal includes device information and an authentication tag. The device information can correspond to information about the device, such as type of device (e.g., a watch, a tablet, or a phone), a state of the device (e.g., whether unlocked or orientation, such as on a wrist or in a pocket), and a version of a protocol or other software. The devices can also scan at some duty cycle. Authentication can occur as part of 501.

Each device registered with an authentication server can have a unique authentication tag. In various embodiments, the authentication tag can involve use of public keys, certificates, and digital signatures. For example, a device can store the public keys of someone in their contact list, and can authenticate a digital signature from a sending device using the public key.

At 502, an event is detected at sending device 510. As an example, the event could be a user input, e.g., an indication of an intent to share data. As another example, the event could be a detection of an advertisement from a receiving device that is being tracked by the sending device, e.g., to provide a reminder to the user of the sending device. Further details about such examples are provided later.

At 503, a BLE antenna 511 transmits and scans at a higher duty cycle. The increased advertisement and scanning can be part of a discovery process for the two devices to detect each other, so that a connection can be created. For example, if sending device 510 detects input that a ranging operation has been requested or is likely to be requested, the increased advertisement/scan can provide quicker establishment of a communications session using the first wireless protocol.

At 504, sending device 510 and receiving device 520 authenticate the other device using an authorization tag. The authentications by the two devices can occur at different times or a same or similar time. The authentication by may occur after later steps, e.g., after transmitting of an advertisement with ranging settings 505 and ranging request messages 507 has begun. At this point, a BLE connection can be considered as created between the two devices.

In some embodiments, as part of establishing a BLE connection, each device can obtain keys for performing encrypted (secure) communications. If a connection was previously made, keys could be re-used. The authentication tag can be used to retrieve stored key(s) for performing the encryption/decryption of future BLE messages.

At 505, BLE antenna 511 transmits an advertisement signal that includes an action command (e.g., that ranging is being requested) and one or more ranging settings. The advertisement can also include an authentication tag. As shown, the ranging settings include rate, dt_tx, and N. The rate can specify a time (e.g., 300 ms for a default transmit/scan rate or 30 ms for an increased transmit/scan) and N can specify a multiple, thereby providing a time delay between each ranging request message. The time offset dt_tx specifies a time after an advertisement signal that the ranging request message is sent. In this manner, receiving device 520 knows when UWB antenna 522 should be turned on. Such an advertisement signal can be sent after authentication has been performed by sending device 510, and potentially after receiving device 520 acknowledges having performed its authentication. In some embodiments, an action command in the advertisement can cause a processor of the receiving device 520 to wake up, or at least for the UWB circuitry (or other circuitry of a first wireless protocol) to be initialized.

The advertisement in 505 can be considered part of a ranging setup handshake. In some embodiments, receiving device 520 can send a message to sending device 510 acknowledging receipt of the ranging settings, or potentially proposing a change to the settings. The ranging setup handshake can include the ranging capabilities of the two devices. Information about the UWB antennas can be provided as different devices can have different numbers of UWB antennas, or a device may want to only turn on a few. A coarse ranging may occur at first, with finer ranging using more UWB receivers occurring after the mobile devices are closer. Other settings/parameters may be provided between ranging operations, e.g., as part of a dynamic decision or updating of software or physical components.

Other examples for ranging capabilities include a number of antennas, location of those antennas (e.g., a relative distances between the antennas), how many antennas to use, encryption protocols, packet format, modes of operation, and supported frequency range. Such capabilities may reflect a software update of either device, resulting in a new or different capability. The ranging setup handshake can include a negotiation about how to carry out the ranging, such as how often to range or how to schedule the ranging (e.g., when there are multiple receiving devices—round robin, one at a time, or other options). A sending device may know it is connected to three different devices, and thus the mobile device may want a lower rate of range measurements to each device (e.g., 25 milliseconds (ms)) or schedule a particular time/frequency to perform ranging with each device. A duty cycle for when the UWB radios are on can be specified, e.g., 1 kilohertz (KHz) or 10 KHz. For instance, when a start message is received, the devices can agree to start ranging 100 milliseconds (or 90 milliseconds for extra margin) from advertisement at 505 and then every 1 KHz after that.

The ranging setup handshake can also manage encryption of the UWB messages, e.g., by deriving a new set of sessions keys for UWB ranging. The keys can be updated periodically, e.g., for each session or every Nth session. In some embodiments, the session keys can be derived from a common shared secret that was used in a challenge-response for authentication, where the derivation uses default or negotiated procedures. Accordingly, the ranging setup handshake can act as a control channel to inform the receiving device about what to expect for the ranging. The ranging setup handshake messages can specify a destination address so as not to cause confusion with any other nearby devices.

At 506, receiving device 520 initiates actions to turn on a UWB antenna 522, or multiple UWB antennas. Such initial steps can prime some circuitry so that UWB antenna 522 is in a ready state, but potentially not fully turned on. This may be the first time that receiving device 520 was able decode an advertisement signal with the ranging settings. Such decoding may occur after receiving device 520 was able to authenticate sending device 510 by a previous advertisement signal.

At 507, sending device 510 sends a ranging request message using UWB antenna 512. The ranging request message is sent dt_tx milliseconds after the advertisement signal in 505. Receiving device 520 knows this timing offset, and thus can turn on UWB antenna 522 within a time window after having detected the advertisement in 505. Other ranging request messages may have been sent previously while not being detected by receiving device 520. For ease of illustration, only one ranging request message is shown. Other advertisements may also be sent before 505, but were not detected by receiving device 520. The ranging request message can specify a destination address of receiving device 520, which can allow other nearby devices to the ranging request message.

At 508, receiving device 520 sends ranging response message using UWB antenna 522. The ranging response message may include times as described for FIGS. 1 and 2.

At 509, sending device 510 determines distance information using times when the ranging request message was sent, times in the ranging response message, and when the ranging response message was received. Examples techniques for determining the distance information are described herein, e.g., for FIGS. 1 and 2.

In some embodiments, a frequency correction can be determined. For example, a frequency offset of the receiving oscillator (clock) with respect to the sending oscillator can allow a determination of distance within an accurate range, e.g., down about 20, 30, or 40 cm. As to using a frequency offset, the sending device can broadcast that its clock is running at a particular rate, e.g., on a particular channel, such as 5 or 9. A resulting frequency error can be used to correct a relative clock drift rate between the clocks, which can improve the accuracy. Other formulations can use an additional messages to further improve the accuracy of the ranging measurement, e.g., as described in U.S. patent application Ser. No. 15/983,388, which incorporated in its entirety for all purposes.

Further ranging can be performed. For example, more than one distance can be determined, which can be used to determine a trajectory, determine greater accuracy, or confirm that the two devices are within a stable proximity to each other (e.g., to estimate that the two users are interacting with each, as may occur during a meeting or a conversation). Such information about a stable proximity can be used to trigger a reminder.

C. Example Ranging Protocol

An example format for a ranging service message format can provide a code (e.g., one octet long) that indicates the type of the message. The length field (e.g., two octets long) can indicate the size in octets of the data field of the message, which may not include the code and length fields. The data field can be variable in length. Thus, the code field can determines the format of the data field and the length field can indicate the length of the data field.

The ranging setup (capability) handshake can be initiated at the start of every connection to exchange state of UWB devices on the mobile devices. The ranging capability request message can have a particular ID code (e.g., 1). Some example parameters for this message include supported features mask, required features mask, software version, link identifier, number of UWB radio devices, and a UWB device descriptor.

The software version parameter can indicate the current ranging software version running on the initiator device. The link identifier can be a random number that allows the responder to match the received UWB packets to the BT connection with the initiator. Thus, the link identifier can be included in UWB messages.

The mobile devices can maintain two features masks such as a supported features mask and required features mask. The supported features mask can indicates supported features. The features mask parameter can be a bit mask of all features. For each feature, a single bit can be specified, e.g., set to 1 if the feature is supported and set to 0 otherwise. Example features are secure ranging, 1-1 ranging (e.g., 1 device to 1 device), and 1-many ranging. The required features mask can indicate required features. For example, support for secure ranging and 1:1 ranging can be mandatory.

The UWB device descriptor can have one entry for each available UWB antenna device (e.g., antenna or node with more than one antenna). A features request message can have one UWB device descriptor entry for each UWB device on the initiating device. Each of the UWB antenna devices can be characterized by a UWB device descriptor with the following parameters: firmware version (e.g., version of current UWB firmware); hardware version (e.g., version of current UWB hardware); and name of UWB manufacturer. The number of UWB devices available can be specific to a particular ranging session. The link identifier can map a BT link to UWB packets.

The ranging capability response message can be similar to the ranging capability request message. The responder may be designated for sending this message. If the responder does not support any feature listed in the required features of the ranging capability request message, the responder can respond with an additional ranging command complete message with an unsupported feature error code. The ranging capability response message can includes the parameters: supported features, software version, number of UWB devices, and UWB device descriptor.

IV. One to Many Ranging

In some embodiments, an electronic device can perform the function of a beacon. The electronic device can be a cell phone, a smartphone, tablet, or similar potable electronic device. The beacon can be fixed or stationary. In general, the techniques include two-way exchanges between the beacon and other electronic devices. The time duration for the responses can be used to calculate range between the beacon and the electronic device. The one to many ranging process can involve numerous message exchanges similar to those described in FIG. 2. In some embodiments, the process can employ a mobile device 310 incorporating multiple antenna (311, 312, and 313) as shown in FIG. 3. The ranging techniques can be employed for the range dependent exchange of information, such as the process of range-based advertising as shown in FIG. 4. In some embodiments, multiple protocols (e.g., Bluetooth Low Energy (BLE) and Ultra-Wide Band (UWB) can be used for ranging techniques as shown in FIG. 5.

Figure 6:
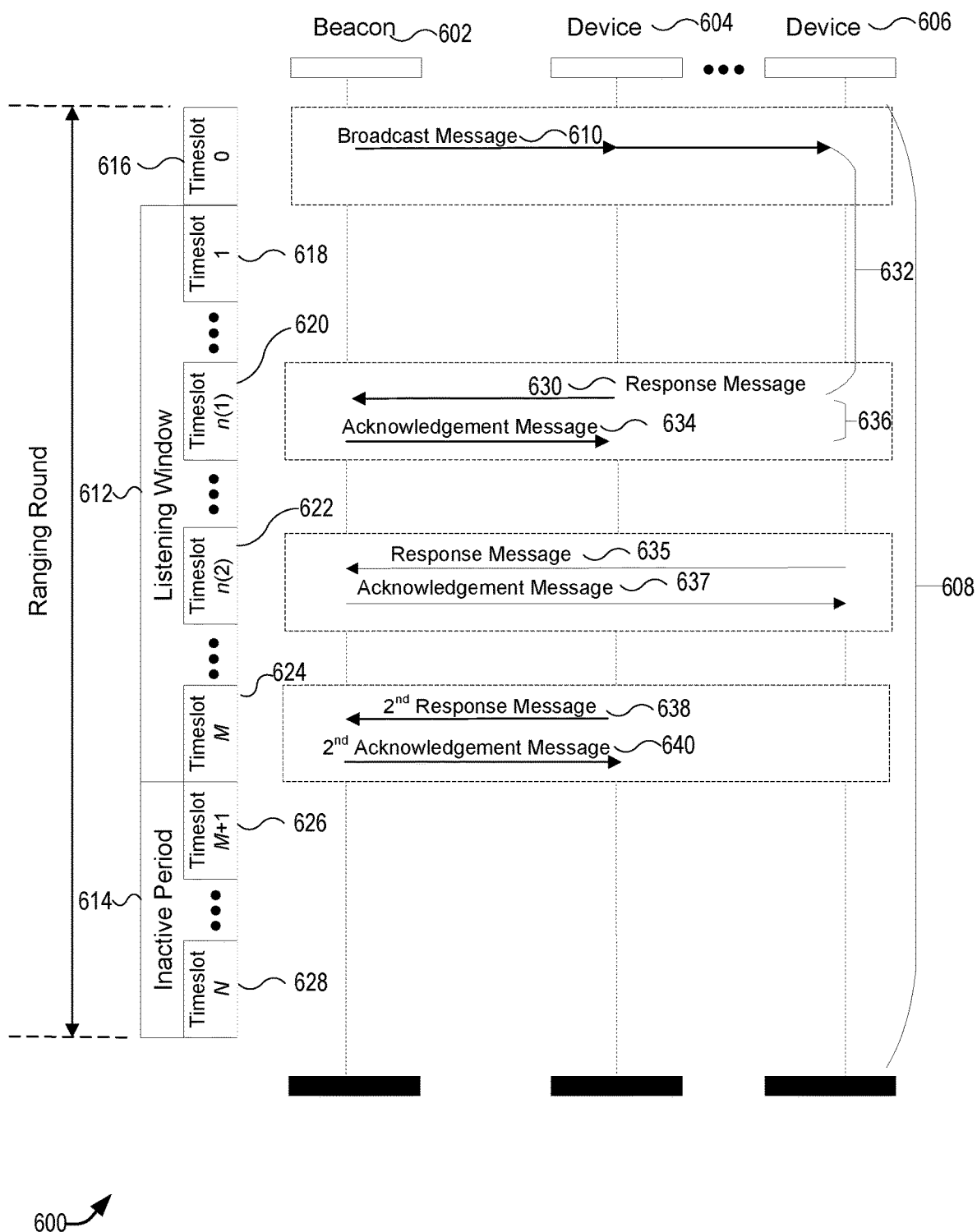
FIG. 6 illustrates a simplified timeline for ranging exchange between a beacon and a computing device.

FIG. 6 illustrates an exemplary ranging exchange 600 between a beacon 602 and a plurality of computing devices (e.g., a device 604, and a device 606). Although only two devices are shown in FIG. 6, many more computer devices can participate in the ranging depending on the number of timeslots available in the listening window 612. The following techniques can be implemented to allow multiple devices to conduct ranging with a beacon device, while minimizing or avoiding collisions between messages. One of the many devices can be identified as the beacon device. The time period for conducting ranging between the beacon device and the multiple computing devices is a ranging round. The ranging round can be repeated one or more times based on requirements for an application executing on the devices. The structure for the ranging round is disclosed below.

A. Ranging Round

In one embodiment, the technique includes one or more ranging rounds 608. A ranging round 608 can be temporally divided into discrete windows including an initial timeslot 616 (i.e., timeslot 0), a listening window 612, and an inactive period 614. Prior to the ranging round 608 starting, the beacon device 602 can determine the parameters for the ranging round 608 including the initial timeslot 616, the number of response timeslots, and the duration of each response timeslot. The parameters of the ranging round 608 can be based in part on the number of computing devices in the ranging round 608 and any information concerning known distances between the devices 604, 606. The parameters of the ranging round 608 can be generated by the one or more processors of the beacon device 602 and stored in a memory of the beacon device 602. The parameters of the ranging round 608 can be incorporated into a broadcast message 610 for transmission to the other devices 604, 606. The parameters of the ranging round 608 can also be defined by a certain protocol used for the ranging.

The number and duration of slots for the ranging round 608 can dynamically change. For example, if the number of collisions detected increases, the number of slots can be increased for the ranging round 608. This will allow more slots for the ranging round 608 providing increased opportunities for second response messages 638 in the case of collisions during an earlier timeslot. If the number of detected collisions decreases, the number of available slots can be decreased to reduce power requirements for ranging.

The broadcast message 610 can be transmitted by the beacon device 602 during the initial timeslot 616. In some embodiments, the time and duration of the initial timeslot 616 can be included in the broadcast message 610. In this way, devices 604, 606 receiving the broadcast message 610 will know not to conduct ranging during the initial timeslot 616.

The broadcast message 610 can also include an identifier of the beacon 602. The identifier of the beacon can be received by devices 604,606 and subsequently included in the response message 630 so the beacon 602 can identify that the response message 630 is associated with the broadcast message 610 transmitted by the beacon 602. In some embodiments, the identifier can be provided by the manufacturer of the electronic device (e.g., International Mobile Equipment (IMEI) number). In some embodiments, the identifier can be a portion of an IMEI number (e.g., only last five digits).

The duration of each of the timeslots can also be specified in the broadcast message 610. By specifying a number and duration of each of the timeslots, the devices 604, 606 can select from a number of different defined time periods to conduct ranging to reduce the potential for missed messages from collisions between messages on the same channel. The failure for a device 604, 606 to receive an acknowledgment message 634 from the beacon 602 in response to the response message 630 can be an indication of two devices transmitting in the same timeslot. Instead of just re-transmitting the response message 630 again during the same timeslot, a different timeslot that is later in time during the listening window 612 can be selected by the device to conduct ranging. In this way, the potential collisions by multiple devices 604, 606 conducting ranging operations during the same timeslot can be reduced.

The beacon 602 can transmit the broadcast message 610 to initiate the process at Timeslot zero 616. The listening window 612 and corresponding timeslots can begin immediately after the broadcast transmission is complete.

The parameters for a ranging round 608 can be communicated from the beacon 602 to the plurality of computing devices via the broadcast message 610. For example, FIG. 6 shows timeslot-1 618 through Timeslot-M 622 in the listening window 612. M can be an integer greater than 2. The number of timeslots can be related to the number of devices participating in the ranging session. As the number of devices participating increases, the number of timeslots should also increase.

Following the initial timeslot 616, a listening window 612 begins. The listener window 612 can be divided into multiple, non-overlapping timeslots (e.g., Timeslot-1 618 to Timeslot-M 624) to provide designated times for the computing devices to conduct ranging with the beacon device 602. The timeslots offer a designated window of time for a device 604, 606 to conduct ranging with the beacon 602. A device 604, 606 can receive the ranging round parameters such as the number and duration of the timeslots from the beacon device 602. From these parameters, each of the devices 604, 606 can independently select a timeslot to conduct ranging with the beacon 602. Under some circumstances, more than one device 604, 606 can select the same timeslot resulting in undesirable missed messages due to collisions. Therefore, the devices 604, 606 can select the timeslot to conduct ranging randomly or pseudo-randomly to reduce the potential for collisions. The timeslots can be temporally based on a time period from the beacon's transmission of the broadcast message 610. In some embodiments, the listening window 612 can include 20 to 40 timeslots. The duration of the timeslots can be in the order of milliseconds (ms).

The timeslots provide an opportunity for the devices 604, 606 to conduct a ranging session with the beacon 602. Upon receiving the broadcast message 610, the one or more processors of devices 604, 606 execute a routine to select a timeslot of the multiple timeslots defined in the broadcast message 610. The selected timeslots can be stored in the memory of the devices 604, 606. The selection of the timeslot is discussed below.

During the selected timeslot, a device 604, 606 transmits a response message 630 to the beacon 602. The response message 630 can include information the beacon 602 needs to identify the device 604, 606. In addition, the response message can include information to link the response message 630 to the beacon 602 such as the identifier of the beacon 602. The response message 630 can also include an estimate distance between the beacon 602 and the device 604, 606 that can be calculated by one or more processors of the device 604, 606.

During the selected timeslot, upon receiving the response message 630, the one or more processors of beacon 602 can calculate a first distance between the beacon 602 and the device 604, 606. The first distance can be calculated by recognizing the timeslot that the device 602, 604 is responding. The beacon 602 knows when the timeslot begins and can calculate a time duration from beginning of the timeslot until reception of the response message 630. The time duration is related to the first distance between the beacon 602 and device 604, 606. The first distance can be calculated be calculated by multiplying the time duration by the speed of light (c). In some embodiments, a processing time by the beacon 602 can be subtracted from the time duration to account for any delays in receiving and processing the response message 630.

During the selected timeslot, the beacon 602 can transmit an acknowledgement message 634 to the device 604, 606. The acknowledgement message 634 informs the device 604, 606 that the response message 630 has been received by the beacon 602. In some embodiments the acknowledgement message 634 can include information such as an identifier of the beacon 602, an identifier of the device 604, 606, a first distance between the beacon 602 and a device 604, 606, and a delay time.

Under some circumstances, collisions between messages transmitted on the same channel can result in a beacon 602 not receiving a response message 630 or a device 604, 606 not receiving an acknowledgment message 634. The devices 604, 606 can determine that it has not received the acknowledgment message in response to the response message 630 it transmitted. In these circumstances, the device 604 can select a second timeslot to transmit the second response message 638. The timeslot 624 for the second response message 638 can be selected randomly or pseudo-randomly. In response to receiving the second response message 638, the beacon 602 can transmit a second acknowledgement message 640 to the device 604. The second acknowledgement message 640 informs the device 604, 606 that the second response message 638 has been received by the beacon 602. In some embodiments the second acknowledgement message 640 can include information such as an identifier of the beacon 602, an identifier of the device 604, 606, a first distance between the beacon 602 and a device 604, 606, and a delay time. Under some circumstances, the second acknowledgement message 640 may not be received due to collisions between the messages. In this case, a third timeslot can be selected for ranging between the devices. This process can continue until all devices 604, 606 have received an acknowledgement message from the beacon 602.

Following the listening window 612, the ranging round 608 includes and inactive period 614. The inactive period 614 provides a time delay between ranging rounds 608 in order to preserve power on the beacon device 602 and the responding devices 604, 606. If there was no inactive delay, the ranging rounds can occur too frequently resulting in increased power consumption of the devices. The inactive period can also be divided into multiple timeslots e.g., Timeslot-M+1 626 and Timeslot-N 628. In various embodiments, there can be only one timeslot in the inactive period 614.

B. Slot Selection

In computer networking, multicast is group communication where data transmission is addressed to a group of destination computers simultaneously. Multicast can be one-to-many or many-to-many distribution. In multicast techniques, the timeslots will be allocated. In contrast, in broadcast scenarios the timeslots will not be assigned. In broadcast situations, the beacon 602 does not know how many responding devices (e.g., device 604 and device 606) there are or what the identifications of the responding devices will be.

The devices 604, 606 can receive the broadcast message 610 transmission. Upon receipt and processing of the broadcast message 610, the mobile device 604, 606 can select one of the timeslots (e.g., 618-624) listed in the broadcast message 610 for sending the response message 630 to conduct ranging between the devices. The devices 604, 606 are not be assigned to a particular timeslot 618, 620, 622, 624. Instead, the devices 604, 606 can select one of the timeslots 618, 620, 622, 624 for transmission of a response message 630. The selection can be made randomly or pseudo-randomly. The random or pseudo random selection reduces the amount of missed messages due to collision of messages on the channel.

As depicted, device 604 selects timeslot 620. Device 604 receives the broadcast message 610 during Timeslot-0 616 then waits until the start of timeslot-n(1) 620. Ranging with other devices could occur in the interim during timeslot-1 618. During the selected timeslot 620, device 604 transmits a response message 630. The response message 630 can include an identifier (e.g., International Mobile Equipment (IMEI) number) of device 604.

The time period between the reception of the broadcast message 610 at the device 604 and the time of the transmission of the response message 630 can be known as the Reply Time (D1) 632. The Reply Time (D1) 632 can include the processing time at the device 604 to receive and process the contents of the broadcast message 610, generate the response message 630, and transmit the response message 630. The Reply Time (D1) 632 also includes the waiting time until the selected timeslot begins. The Reply Time (D1) 632 can also be referred to as the received (RX) to transmission (TX) time.

During the selected timeslot, the beacon 602 can receive the response message 630. The beacon 602 can calculate a round-trip time (R1) as the time difference between a broadcast message 610 transmission time (at timeslot zero) and a response message 630 reception time. In response to receiving the response message 630, the beacon 602 can generate an acknowledgement message 634. The beacon 602 can also calculate a reply time 636 (D2) between receiving response message 630 and transmitting an acknowledgement message 634. The beacon 602 can calculate a first distance between the beacon 602 and the device 604 by multiplying the round-trip time (R1) by the speed of light (c).

The acknowledgement message 634 can include information such as: an identifier of the beacon 602, an identifier of the device 604, the round trip time R1, a first distance, and the reply time 636. The beacon 602 can use the round-trip time (R1) and Reply Time (D2) 632 to calculate a coarse range estimate between the beacon 602 and device A 604. By responding within a designated time period, the beacon 602 can determine what timeslot (618, 620, 622, 624) was selected by the responding device. The Reply Time (D2) 636 should be shorter than Reply Time (D1) 632 because there is no specific waiting period by the beacon 602 to transmit the acknowledgment message 634. The Reply Time (D2) 636 only includes the time that the beacon 602 receives and processes the response message 630 and the time the beacon 602 takes to generate and transmit the acknowledgement message 634.

Similarly, device 606 can receive the broadcast message 610 in timeslot-0 616. Device B 606 can respond by sending a response message 630 in Timeslot-n(2) 622. The beacon 602 can receive the response message 635 from device 606 and generate and transmit the acknowledgement message 637 within timeslot-n(2) 622. The information contained in the response message 635 can be similar to the types of information response message 630 as described above. The information contained in the acknowledgement message 637 can be similar to the types of information contained in the acknowledgement message 634 as described above. Other timeslots of the M total number of timeslots can be also used for In the event that a device 604 or device 606 fails to receive an acknowledgement message 634 or acknowledgement message 637, a presumption can be that there has been a collision between the transmitted messages. When a packet collision occurs, the packets are either discarded or sent back to their originating stations and then retransmitted in a timed sequence to avoid further collision. Packet collisions can result in the loss of packet integrity or can impede the performance of a network. Packet collisions can result in the beacon 602 or devices 604, 606 failing to calculate a range. The devices conduct ranging on a single channel that can use a single discrete frequency. If the beacon 602 or devices 604, 606 are communicating on the same channel at the same time, the interference between the other devices and result in undesirable data collisions during the exchange. If either of devices 604, 606 does not receive an acknowledgement message 634 or acknowledgement message 637, the device 604, 606 can be programmed to transmit a second response message 638. If sufficient time remains within the selected timeslot, the second response message can be transmitted within the originally selected timeslot. In some embodiments, the device 604, 606 can select a different timeslot (e.g., timeslot-M 624) to transmit the second response message 635. In this case, the beacon 602 can transmit a second acknowledgement message 640. The second acknowledgement message 638 can include the same types of information described above for the first acknowledgement message 634. In the case of further collisions, this process can be repeated until the second acknowledgement message 640 is received by the device.

C. Range Calculation

Figure 7:
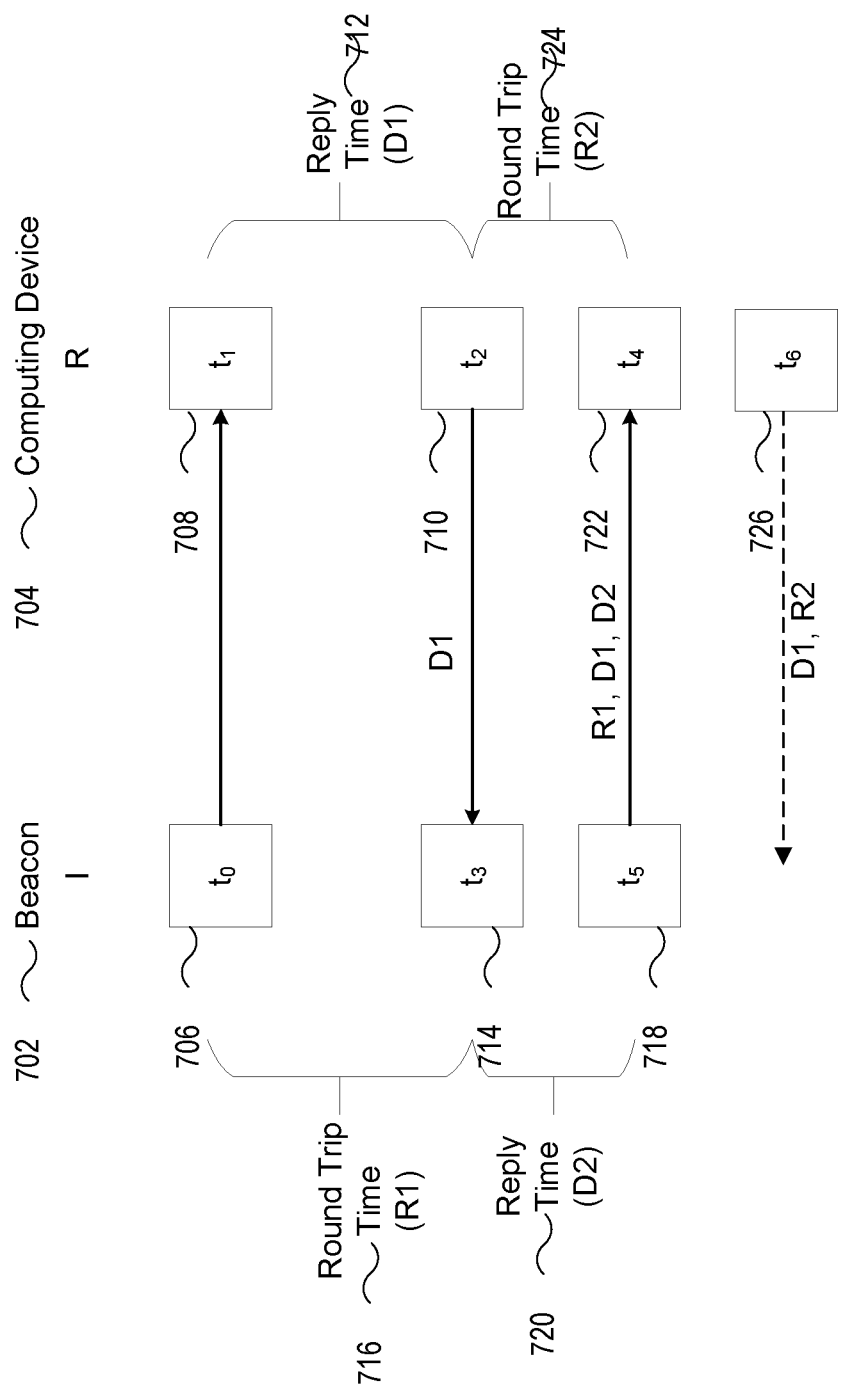
FIG. 7 illustrates an exemplary flowchart for a ranging technique performed by a beacon.

FIG. 7 illustrates a simplified timeline 700 for ranging exchange between a beacon 702 and a computing device 704. At time to 706 the beacon 702 can transmit a broadcast message. The broadcast message can be received by a computing device 704 at time $t_1$ 708. At some time later at $t_2$ 710, the device 704 can transmit a response message to the beacon 702. The Reply Time (D1) 712 can be the elapsed time between $t_1$ 708 and $t_2$ 710. The Reply Time (D1) 712 can include any delay in processing the broadcast message, and generating and transmitting the response message. The Reply Time (D1) 712 can also include the delay waiting for the selected timeslot to begin.

The response message can be received by the beacon 702 at time $t_3$ 714. The Round Trip Time (R1) 716 can be calculated as the elapsed time between the to 706 and $t_3$ 714. In some embodiments, the device 704 can transmit include the reply time (D1) 712 as part of the information contained in the data packet sent to the beacon 702. The beacon 702 can calculate a time of flight (TOF) by subtracting the Reply Time (D1) 712 from the Round Trip Time (R1) 716. The beacon 702 can calculate a coarse range between the beacon 702 and the device 704 can be calculated by multiplying the TOF by the speed of light (c) or a fixed speed of 299, 794, 458 meters per second.

Upon receiving the response message, the beacon 702 generates and transmits an acknowledgement message at time $t_5$ 718. The Reply Time (D2) can include the elapsed time between $t_5$ 718 and $t_3$ 714. The Reply Time (D2) can include the processing time to receive the response message, generate, and transmits the acknowledgement message. In some embodiments, the acknowledgement message can include the information such as the round trip time (R1) 716 and the Reply Time (D2) 720.

The acknowledgement message can be received by the device 704 at time $t_4$ 722. The device 704 can receive the acknowledgement message. In some embodiments, the device 704 can receive the acknowledgement message containing the round trip time (R1) 716, the reply time (D1) 712, and reply time (D2) 720 to calculate a precise range between the beacon 702 and the device 704. The device 704 can calculate a time of flight (TOF) or a time difference by subtracting the reply time (D2) 720, from the round trip time (R2) 724. As computing signals travel at the speed of light (c), a precise range between the device 704 and the beacon 702 can be determined by multiplying the speed of light by the TOF.

In some embodiments, the device 704 can transmit a ranging message at time $t_6$ 726 from the device 704. The ranging message can include the round trip time (R2) 724 and the Reply Time (D1) 712. The beacon 702 can receive the ranging message to calculate a precise range between the beacon 702 and the device 704.

The Acknowledgement message(s) received by the device 704 can be checked to determine an identifier of the device that transmitted the response message. The device 704 will ignore acknowledgement messages with different identifiers.

In some embodiments, a third transmission can be sent from the device 704 to the beacon 702. In some embodiments, the third transmission can include the time of flight (TOF) calculation. In some embodiments, the third transmission can include the calculated range.

Each of the devices of the plurality of devices can similarly determine the range of the device 704 from the beacon 702. The multiple devices do not communicate their selected timeslots with each other. As a result, one or more devices may select the same time slot. As the devices transmit the information packets on the same frequency, collisions can occur between the data packages resulting in lost data. The greater the number of participating devices, the greater the likelihood that the devices will select the same timeslot, possibility resulting in an increased number of collisions between the data packages. Conversely, the few the number of participating devices, the lower the likelihood there will be collisions and lost data.

In some embodiments, the number of timeslots within the ranging round can vary. The number of timeslots can increase based on the number of collisions. As previously described, the number of computing devices in the vicinity of the beacon can affect the number of collisions. As more collisions are detected, the number of slots can be increased to accommodate the number of devices. As fewer collisions are detected, the number of slots can be decreased to reduce power requirements for the beacon.

D. Ranging Techniques Performed by a Beacon

Figure 8:
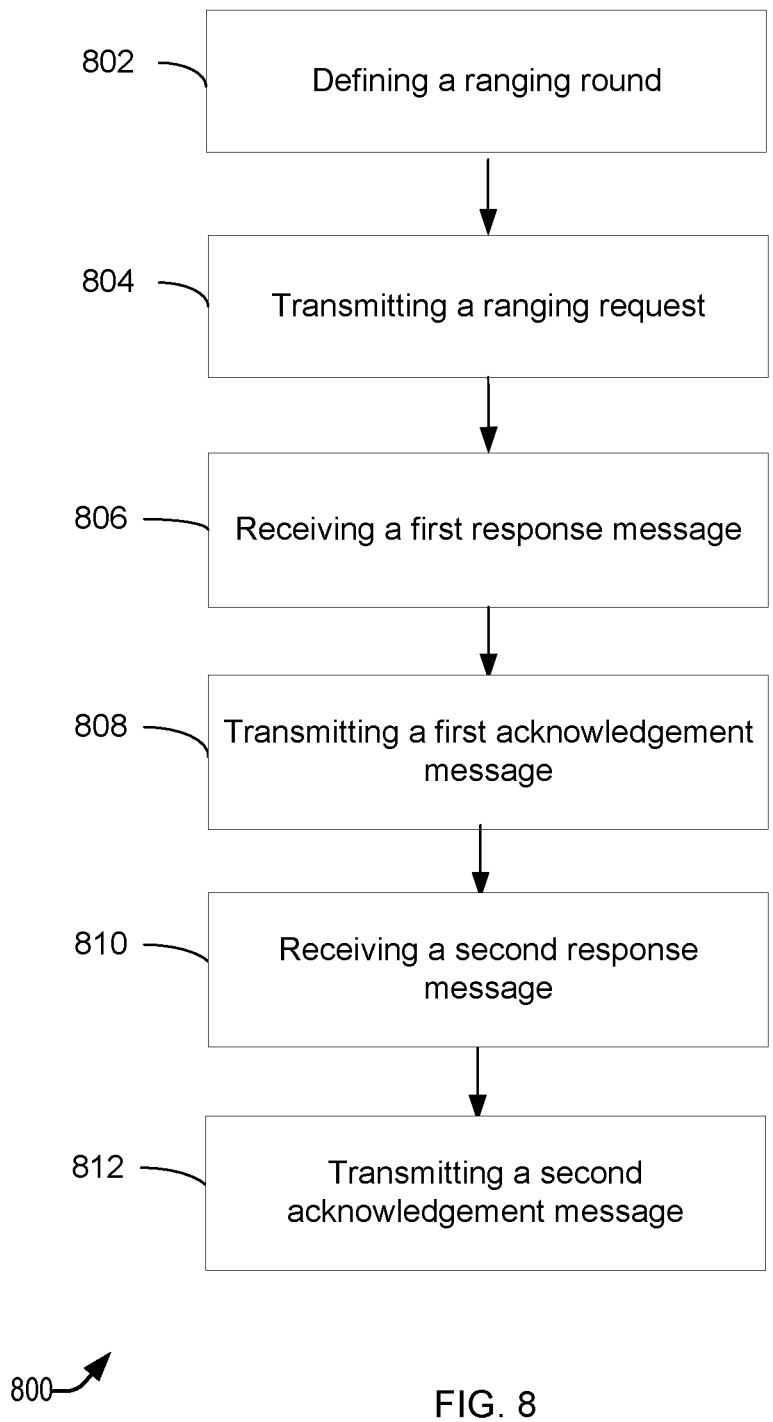
FIG. 8 illustrates an exemplary flowchart for a ranging technique performed by a computing device.

FIG. 8 illustrates an exemplary flowchart for a ranging technique performed by a beacon. Method 800 can be used to determine a spatial relationship of other devices to the beacon. Method 800 can be performed by any device that acts as a sending/beacon device.

At 802, the beacon device can define a ranging round. The ranging round can include an initial timeslot and a plurality of response slots for discovering and performing ranging with any mobile device in a vicinity of the beacon device. Each of the response slots is non-overlapping in time with other of the plurality of response slots. The beacon device can determine a number of response slots, a total ranging time, a duration of each of the timeslots, a number of timeslots for an inactive period, and a total time for the inactive period. In some embodiments, the defining the ranging round includes modifying the response slots.

At 804, a beacon can transmit a ranging request. The ranging request can correspond to the broadcast message 610 as shown in FIG. 6. The ranging request can be transmitted in any number of the response slots and is not limited to slot 1. The ranging request can use the ultra-wide band protocol (UWB). The ranging request can be associated with a ranging round having a plurality of response slots. Each of the plurality of response slots is non-overlapping in time with other of the plurality of response slots. The ranging request can be associated with a beacon identifier of the beacon device. In this way, the devices can limit the responses to ranging requests only originating from the beacon device. The ranging request can include information on a number of available slots. In some embodiments, ranging request can include information on the length or duration of the timeslots for a ranging round. The beacon can be a computing device (e.g., a smartphone).

At 806, during a first response slot of the plurality of response slots, the beacon can receive a first response message. The first response slot can include the timeslot-n (1) 620 as shown in FIG. 6. The first response message can correspond to the response message 630 as shown in FIG. 6. The first response message can be packet information including an identifier of the first device that transmitted the response message. The identifier can be an IMEI number. The first response message can also include Reply Time (D1) or the elapsed time from receipt of the broadcast message until transmission of the first response message. The Reply Time (D1) can include any delay waiting for the start of the selected timeslot. The Reply Time (D1) can also include any processing time for receiving and processing the broadcast message and processing and transmitting the first response message. The first response message can also include a rough estimate of the distance to the beacon as calculated by one or more processors of the device. The first response message can also include a beacon identifier.

In some embodiments, the beacon can calculate a round trip time. The round trip time can be the elapsed time between the ranging request and the time of receipt of the response message. The one or more processors of the beacon can use the round trip time to calculate a coarse range between the beacon and the computing device.

In some embodiments, the beacon can calculate a reply time. The reply time can be the elapsed time between receipt of the response message and transmission of an acknowledgement message. The reply time can include the processing time by the beacon in receiving, processing the response message, generating, and transmitting the acknowledgement message.

At 808, during a first response slot, the beacon can transmit a first acknowledgement message. The first acknowledgement message 634 can correspond to the acknowledgement message 634 as shown in FIG. 6. The beacon can generate the first acknowledgement message that can include information packets. The information packets can include the first identifier for the computing device that transmitted the response message. The information packets can also include the calculated round trip time and the reply time.

At 810, during a second response slot of the plurality of response slots, the beacon can receive a second response message at a second response time. The second response slot can correspond to the Timeslot-n(2) 622 as shown in FIG. 6. The second response message can correspond to the response message 635 as shown in FIG. 6. The second response message can be packet information including an identifier of the second device that transmitted the second response message. The identifier can be an IMEI number. The second response message can also include Reply Time (D1) or the elapsed time from receipt of the broadcast message until transmission of the second response message. The second Reply Time (D1) can include any delay waiting for the start of the selected timeslot. The second Reply Time (D1) can also include any processing time for receiving and processing the broadcast message and processing and transmitting the second response message. The second response message can also include a rough estimate of the distance to the beacon as calculated by one or more processors of the device. The second response message can include the beacon identifier.

At 812, during a second response slot, the beacon can transmit a second acknowledgement message. The second acknowledgement message can correspond to the acknowledgement message 637 as shown in FIG. 6. The beacon can generate the second acknowledgement message that can include information packets. The information packets can include the second identifier for the computing device that transmitted the response message. The second time information can be determined using the second response time. The second time information can indicate a second distance between the beacon device and the second mobile device. The information packets can also include the calculated round trip time and the reply time.

In various embodiments, messages can be missed due to data packet collisions. The device can detect that an acknowledgement message is not received. After a period of time, the beacon can receive a third response message. The third response message can correspond to the second response message 638 as shown in FIG. 6. The third response message can be packet information including an identifier of the first device that transmitted the response message. The identifier can be an IMEI number. The third response message can also include Reply Time (D1) or the elapsed time from receipt of the broadcast message until transmission of the third response message. The Reply Time (D1) can include any delay waiting for the start of the selected timeslot. The Reply Time (D1) can also include any processing time for receiving and processing the broadcast message and processing and transmitting the third response message. The third response message can also include a rough estimate of the distance to the beacon as calculated by one or more processors of the device. The third response message can also include a beacon identifier. The third response message can be transmitted from the first device. In response to receiving the third response message, the beacon can generate a third acknowledgement message.

During a third response slot, the beacon can transmit a third acknowledgement message. The third acknowledgement message 634 can correspond to the second acknowledgement message 640 as shown in FIG. 6. The beacon can generate the third acknowledgement message that can include information packets. The information packets can include the first identifier for the computing device that transmitted the response message. The information packets can also include the calculated round trip time and the reply time.

In some embodiments, the technique can include dynamically changing a number of the plurality of response slots at least in part on collisions detected during the response slots. In some embodiments, the technique can further include increasing the number of the plurality of response slots based at least in part on the numbed if missed messages due to collisions.

In some embodiments, the beacon can transmit information to one or more of the mobile devices based at least in part on the determined distance between the beacon and the mobile device. As another example, the distance information obtained from ranging can be used to trigger a notification (e.g., a reminder) to be output from a first mobile device. For example, a first user of the first mobile device may wish to get a reminder when the first user is close to a second user, who has a second mobile device. The ranging capability can enable the first user to be reminded at an opportune time, e.g., when the two users are talking. Often, a person may forget to bring up an issue (e.g., to get back loaned money or an issue on a work project) until after the two users have already walked away from each other. Such reminder functionality, which uses the distance information obtained from the ranging between the two mobile devices, can solve such a problem. As another example, a user may want a notification (e.g., an alert) when a distance between the two devices is greater than a threshold, e.g., when the other device belongs to a child of a parent who is a user of a first device.

E. Sequence Diagram

Figure 9:
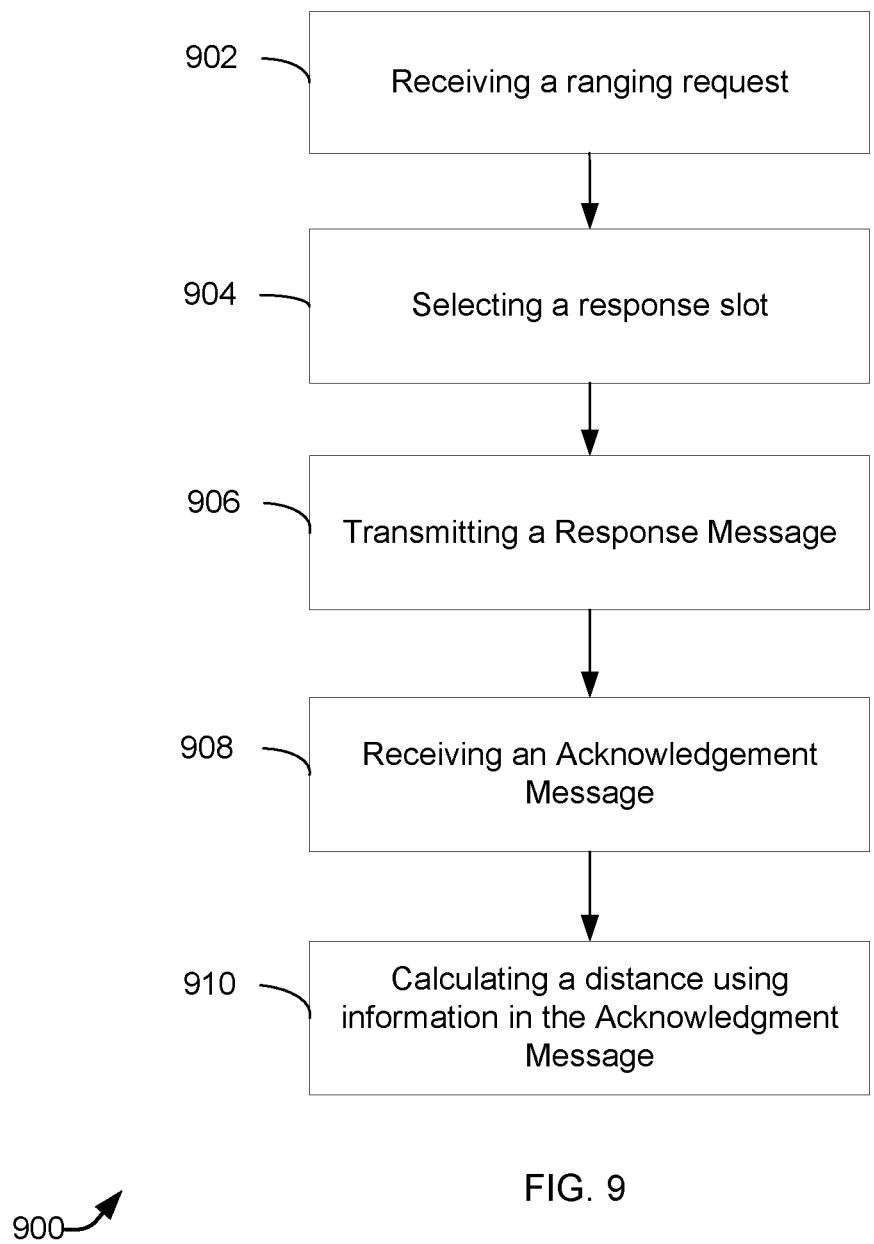
FIG. 9 shows a sequence diagram of a ranging operation involving a mobile device having three antennas according to embodiments of the present disclosure.

FIG. 9 illustrates an exemplary flowchart for a ranging technique performed by a computing device. Method 900 can be used to determine a spatial relationship of other devices to the beacon. Method 900 can be performed by any device that acts as a receiving device.

At 902, the technique at the computing device includes receiving a ranging request from a beacon. The ranging request can correspond to the broadcast message 610 as shown in FIG. 6. The ranging request can be associated with a ranging round having a plurality of response slots. The ranging request message can include information on a number of available slots. Each of the plurality of response slots can non-overlapping in time with other of the plurality of response slots. The ranging request can be associated with a beacon identifier of a beacon device. The ranging request can include an IMEI for the beacon device. The ranging request can be transmitted on a first wireless channel. In some embodiments, the first wireless channel can be a Wi-Fi or a Bluetooth channel.

At 904, the technique includes selecting a first response slot. The computing device can select the first response slot of the plurality of response slots. The first response slot can be randomly or pseudo-randomly selected. The selection can be made by one or more processors of the computing device from a plurality of response slots listed in the ranging request. The selection can be saved in a memory of the computing device.

At 906, the technique includes transmitting a first response message. The first response message can correspond to the response message 630 as shown in FIG. 6. The first response message can be transmitted during the selected first response slot. The first response message can be transmitted over a first wireless channel. The first wireless channel can be a Wi-Fi or a Bluetooth channel. The first response message can include an identifier of the computing device transmitting the response message. The response message can also include information concerning the reply time. The reply time can be the elapsed time between receipt of the response message and transmission of an acknowledgement message.

A beacon can calculate the round trip time based on the information contained in the first response message. The response message can include a time of transmission of the first response message. The computing device can use the a transmission time of the ranging request to calculate a rough distance estimate. In some embodiments, the rough distance estimate can be included in the first response message.

At 908, the technique includes receiving a first acknowledgement message. The first acknowledgement message can correspond to the acknowledgement message 634 as shown in FIG. 6. The first acknowledgement message can be received over a first wireless channel (e.g., Wi-Fi or Bluetooth channel). The acknowledgement message can include a first time information. The first time information is calculated by the beacon device. The first acknowledgement message can include at least one or more of the following: an identifier of the computing device, a round trip time, and a reply time. The identifier of the computing device is used by the device to determine that the acknowledgement message is intended for that device. The round trip time can be an elapsed time. The round trip time can be an elapsed time (in seconds or portions thereof) between the transmission of the ranging request and the receipt of the response message. The reply time can also be expressed in seconds or portions thereof. The acknowledgement message can also include a first distance between the beacon device and the first device. The first distance can be calculated by one or more processors of the beacon device.

At 910, the technique includes calculating a first distance using information in the acknowledgement message. The acknowledgement message can include the first time information. The first time information can be calculated based at least in part on a first time difference between a transmission time of the first response message and a reception time of the first acknowledgement message minus a delay time. The delay time can be calculated as a second time difference between receipt of the first response message and transmission of the first acknowledgment message. The distance is a measurement between the beacon device and the first mobile device. In determining the distance, the computing device can subtract the reply time from the round trip time to calculate the time of flight (TOF). The value of the TOF can be multiplied by the speed of light (c) to determine a distance.

In various embodiments, messages can be missed due to data packet collisions. The device can detect that an acknowledgement message is not received. After a period of time, the device can receive a third response message. The third response message can correspond to the second response message 638 as shown in FIG. 6. The third response message can be packet information including an identifier of the first device that transmitted the response message. The identifier can be an IMEI number. The third response message can also include Reply Time (D1) or the elapsed time from receipt of the broadcast message until transmission of the third response message. The Reply Time (D1) can include any delay waiting for the start of the selected timeslot. The Reply Time (D1) can also include any processing time for receiving and processing the broadcast message and processing and transmitting the third response message. The third response message can also include a rough estimate of the distance to the beacon as calculated by one or more processors of the device. The third response message can also include a beacon identifier. The third response message can be transmitted from the first device. In response to receiving the third response message, the beacon can generate a third acknowledgement message.

In various embodiments, the technique can include dynamically changing a number of the plurality of response slots based at least in part on collisions detected during the plurality of response slots. The technique can further include providing the notification based on the distance exceeding the threshold.

It should be appreciated that the specific steps illustrated in FIG. 8 and FIG. 9 provide particular techniques for capturing and aggregating operational metrics for a third party application according to various embodiments of the present disclosure. Other sequences of steps may also be performed according to alternative embodiments. For example, alternative embodiments of the present invention may perform the steps outlined above in a different order. Moreover, the individual steps illustrated in FIG. 8 and FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

V. Ultra-Wide Band Acquisition Packets (UAPS)

Ultra-Wide Band transmissions are not continuous transmissions, so a receiving device looking to acquire the UWB transmission would either need knowledge of the start time of the transmission or would need to expend energy in a powered-on state listening until the device captures the impulse UWB signal. If the receiving device knows even an approximate time of transmission, the receiver can remain in a reduced-power or sleep mode until just prior to the transmission time. For UWB communications, it can be challenging the receiving device to know when the first packet is going to arrive.

A technique to propagate the UWB transmission times is to broadcast the transmission time information at a defined time after an advertisement signal using another wireless protocol, e.g., Bluetooth Low Energy (BLE) advertisement transmissions. Although examples may refer to Bluetooth, other wireless protocols may be used. BLE has 40 physical channels in the 2.4 GHz ISM band, each separated by 2 MHz. Bluetooth defines two transmissions types: data and advertising transmissions. As such, three of these 40 channels are dedicated to advertising and 37 dedicated to data. Advertising allows devices to broadcast information defining their intentions.

The packet containing the UWB transmission time (referred to as UWB Acquisition Packet (UAP)) can be structured to occur at a specific time relative to the transmitting device's BLE advertisements. Accordingly, the receiving device can listen for the UAPs at an expected time or during an expected time window around the expected time. The UAPs can convey the time of the next UWB poll transmission, which is part of a ranging measurement. For example, ranging requests can be considered poll transmissions. The receiver device can use the time in the UAP to determine when to listen for the next poll. The UAPs can also be transmitted in the UWB frequency range. The technique can also anchor the UAP transmission timing to any other long time sequence such as Apple Wireless Direct Link (AWDL) protocol currently used for Airdrop features.

Figure 10:
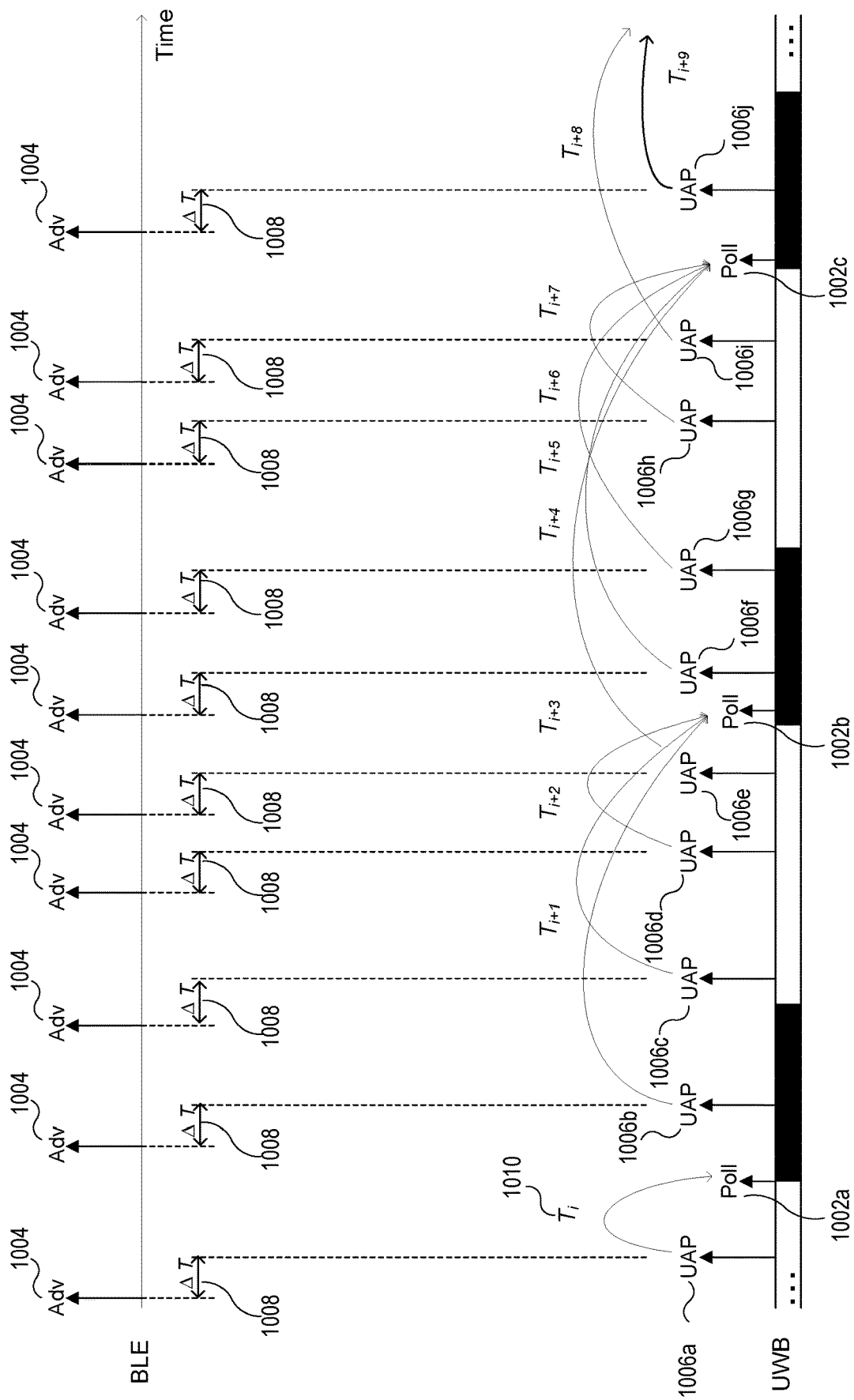
FIG. 10 illustrates an exemplary depiction of a timeline for using advertisement signals to synchronize the timing for transmission of Ultra-Wide Band Acquisition Packets (UAPs).

FIG. 10 illustrates an exemplary depiction of a timeline 1000 for using the BLE advertisement signals to synchronize the timing for transmission of UAPs. FIG. 10 illustrates a timeline 1000 for transmission of multiple signals (e.g., UWB signals and BLE signals) from a single device. A transmitter device can transmit a UWB poll 1002 at regular intervals (e.g., every 100 milliseconds). The transmitter device can also transmit BLE advertisements 1004 more frequently than the UWB poll 1002 transmissions. For example, the BLE advertisements 1004 can be transmitted approximately every 30 milliseconds. The BLE advertisements 1004 can be transmitted irregularly to avoid collisions between data packets. Thus, BLE advertisements 1004 can be transmitted at a predetermined interval (e.g., every 30 seconds) plus some random delay of 0 to 10 milliseconds. This provides random dithering between advertisements. The transmitter device can transmit a UAP message 1006 at a fixed time interval ($\Delta T$) 1008 following the transmission of the BLE advertisement 1004. The time interval ($\Delta T$) 1008 can be predetermined so the receiving device can know to listen for the UAP message 1006 after a predetermined time after transmission of the BLE advertisement 1004.

The transmitter device can calculate the time duration between the transmission of the UAP message 1006 and the next UWB poll 1002. For example, as shown in FIG. 10, the time ($T_i$) is the time interval between the first UAP message 1006a and the first UWB poll 1002a. In some embodiments, the time interval can be around 200 microseconds. The UAP message 1006a can include the time ($T_i$) information. A receiving device that captures the UAP message 1006 can determine that the next UWB poll 1002b will occur at a time interval $T_i$ 1010 after receiving the UAP message 1006, thereby synchronizing the clocks between the transmitting device and the receiving device.

FIG. 10 illustrates three UAP messages 1006b-d between the first UWB poll 1002a and the second UWB poll 1002b. Each of the UAP messages 1000b-d can include the time intervals (e.g., $T_{i+1}$, $T_{i+2}$, and $T_{i+3}$) until the second UWB poll 1002b. Each of the time intervals ($T_{i+1}$, $T_{i+2}$, and $T_{i+3}$) would be different because the time until the next UWB poll 1002b would decrease as time progresses. In some cases, such as for UAP message 1006e, there is not enough time remaining prior to the next UWB poll 1002b. In these cases, the UAP message 1006e provides the time to the subsequent UWB poll 1002c. This process can repeated as necessary.

In a one-to-many ranging scenario, there can be multiple receiver devices, as described above. The UWB poll 1002 can be the ranging request 201 as shown in FIG. 2 or the broadcast message 610 as shown in FIG. 6. For example in cases with one beacon device and three receiving devices in a ranging round, individual communications can be designated in certain time slots (as shown in FIG. 6), and the UAP messages 1006 can be transmitted during those timeslots. If a new receiver device wants to join the ranging session, the new receiver device can determine the timing schedule for the next UWB poll 1002b. In some embodiments, the single broadcast message for one-to-many can be the advertisement signal. The beacon device can transmit the UAP messages 1006 providing the time information to the next UWB poll 1002 (or the broadcast message) from the beacon. In this case, each receiving device that receives the UAP messages 1006 can use the information to determine when to listen for the UWB poll 1002. The UWB poll 1002 can provide information on the time slots for the ranging round. Each receiving device would then determine which timeslot the device is in and add an individual delay prior to responding.

In other embodiments, for each time slot there can be a different BLE advertisement signal 1004 and different UAP messages 1006 for that specific timeslot to synchronize the timing between the transmitting device and the receiving device in the timeslot.

FIG. 11A illustrates an exemplary flowchart for transmission of UWB acquisition packets by a beacon. FIG. 11B illustrates an exemplary flowchart for reception of UWB acquisition packets by a receiving device. Method 1100 can be used to provide the time of the UWB poll signals. Method 1100 can be performed by any device that acts as a sending/beacon device.

At 1102, the beacon device can transmit advertising packets using a first wireless protocol. The first wireless protocol can be Bluetooth Low Energy (BLE) advertising but other wireless protocols can be used. The advertising packets can be routinely transmitted by the beacon or transmitting device. The advertising packets can include information such as Preamble, Access Address, cyclic redundancy check, address of the sender, and advertising payload. The advertising packets can be received by receiving mobile devices. For example, the advertisements can be transmitted approximately every 30 milliseconds. The advertisements can be transmitted irregularly to avoid collisions between data packets. Therefore, advertisements can be transmitted at a predetermined interval (e.g., every 30 seconds) plus some random delay of 0 to 10 milliseconds. This provides random dithering between advertisements.

The beacon device can wait a predetermined time period after transmitting the advertising packets. In some embodiments, the predetermined time period may be 200 microseconds. Receiving devices can be programmed to activate (if in a powered-off or reduced-power mode) to listen for the UWB acquisition packet during this predetermined time period after receiving the advertising message.

At 1104, the beacon can calculate the time under the next UWB poll transmitted using the second wireless protocol. The UWB poll can be a ranging request message or broadcast message. UWB poll can be routine transmitted (e.g., every 100 milliseconds) by the beacon device. The beacon device knows the time of the transmission of the advertising packets, the predetermined delay, and the time of the next UWB poll. Therefore, the beacon can calculate the time from the advertising packets and the next UWB poll. This calculated time can be included in the UWB acquisition packet. In various embodiments, there can be multiple UWB acquisition packets between each of the UWB poll. Therefore, each UWB acquisition packets can include different calculated times.

At 1106, the beacon can transmit, using the second wireless protocol, the UWB acquisition packet including the calculated time until the next UWB poll. The UWB acquisition packet can be transmitted at a predetermined time (e.g., $\Delta T$ in FIG. 10) window after transmitting the advertising packet. The receiving device(s) can receive the UWB acquisition packet and use the calculated time to know when (e.g., a time range) to listen for the next UWB poll.

Method 1150 can be used to identify a time for receiving UWB poll signals. Method 1150 can be performed by any device that acts as a receiving device.

At 1152, the receiving device can receive the advertising packet via a first wireless protocol. The first wireless protocol can be BLE or another compatible wireless protocol. The adverting packet can be received at an irregular schedule to avoid missed messaged due to collisions between packets.

At 1154, the receiving device can determine a first window to listen for the UWB acquisition packet based on a fixed time interval ($\Delta T$) from the reception of the advertising packet. The fixed time interval can be predetermined by programming. The fixed time interval ($\Delta T$) can be used to create a first listening window slightly before and after the time of reception of the advertising packet plus the fixed time interval ($\Delta T$). The start and end of the first time window can be variable. The first listening window can be used for receiving the UWB acquisition packet (UAP). Receiving devices can be programmed to activate (if in a powered-off or reduced-power mode) to listen for the UWB acquisition packet during this first time window after receiving the advertising message.

At 1156, the receiving device can listen in a first widow around an expected time and receive the UWB acquisition packet via a second wireless protocol. In some embodiments, the second wireless protocol can be UWB. In various embodiments, UAPs are transmitted over UWB, in order to convey more accurate timing information about the UWB poll packet. Such accurate timing information is more suitably conveyed when UAPs exist in the same time domain as the UWB chip's clock. The device can process the time information contained within the packet. The time information can be stored in the memory of the receiving device.

At 1158, the receiving device can use the time information from the UWB acquisition packet to calculate a second window to receive the UWB poll (e.g., the ranging request message or broadcast message). The receiving device can determine a second window that starts at a first set time before the UWB poll to a second set time after the UWB poll. The receiving device can be enter or remain in a powered-off or reduced-power mode until the beginning of the second window thereby reducing power requirement for the receiving device.

At 1160, the receiving device receives the UWB poll. The UWB poll provides information for the ranging session to the receiving device. The receiving device can use the information in the UWB poll to participate in the ranging session. In some embodiments, at a selected time period the receiving device transmits a response message.

Figure 11:
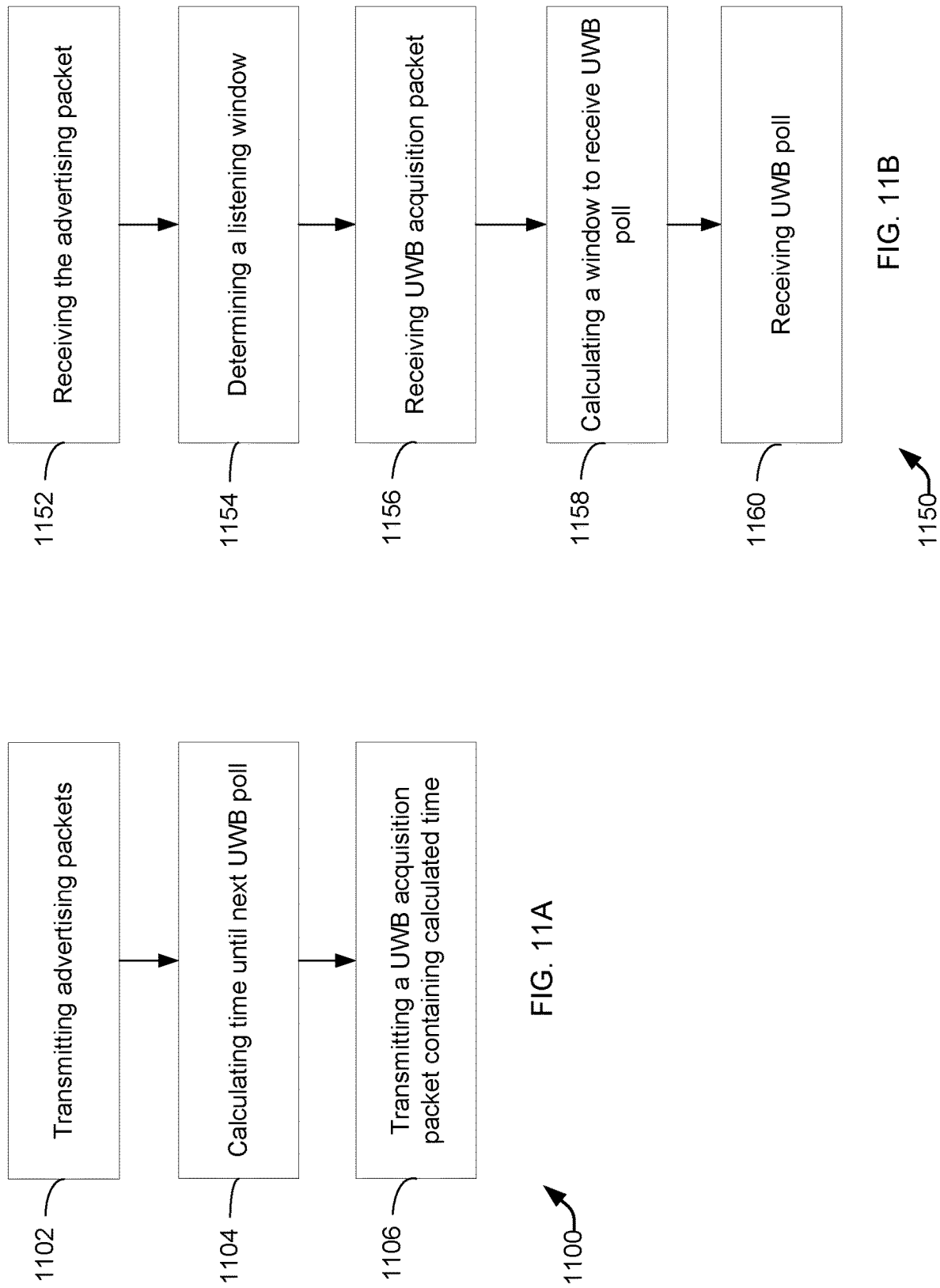
FIGS. 11A-B illustrates an exemplary flowchart for a transmitting and receiving Ultra-Wide Band Acquisition Packets (UAPs).

It should be appreciated that the specific steps illustrated in FIG. 11 provides particular techniques for capturing and aggregating operational metrics for a third party application according to various embodiments of the present disclosure. Other sequences of steps may also be performed according to alternative embodiments. For example, alternative embodiments of the present invention may perform the steps outlined above in a different order. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize many variations, modifications, and alternatives.

VI. Mobile Device for Performing Ranging

Figure 12:
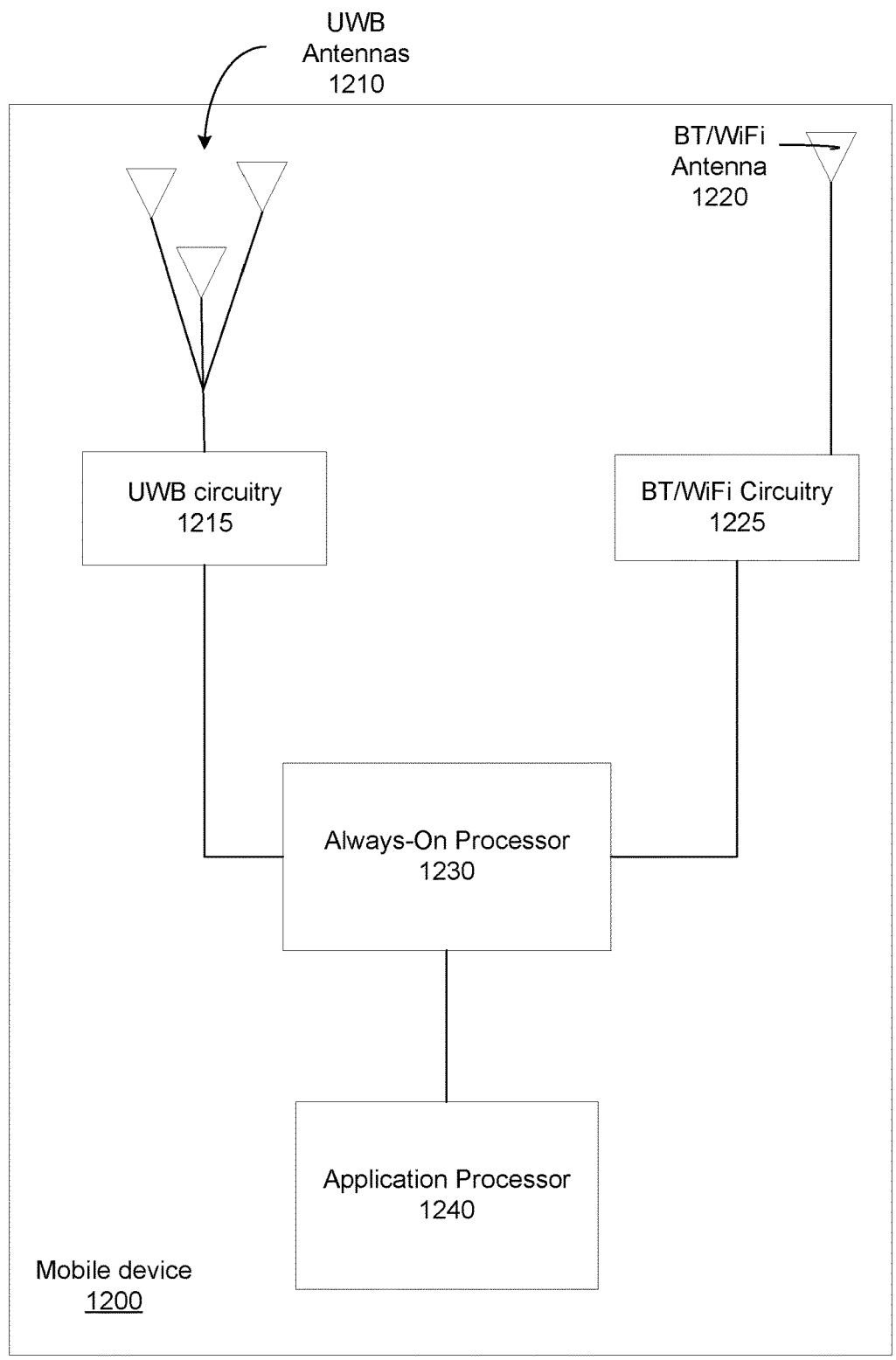
FIG. 12 is a block diagram of components of a mobile device operable to perform ranging according to embodiments of the present disclosure.

FIG. 12 is a block diagram of components of a mobile device 1200 operable to perform ranging according to embodiments of the present disclosure. Mobile device 1200 includes antennas for at least two different wireless protocols, as described above. The first wireless protocol (e.g., Bluetooth) may be used for authentication and exchanging ranging settings. The second wireless protocol (e.g., UWB) may be used for performing ranging with another mobile device.

As shown, mobile device 1200 includes UWB antennas 1210 for performing ranging. UWB antennas 1210 are connected to UWB circuitry 1215 for analyzing detected signals from UWB antennas 1210. In some embodiments, mobile device 1200 includes three or more UWB antennas, e.g., for performing triangulation. The different UWB antennas can have different orientations, e.g., two in one direction and a third in another direction. The orientations of the UWB antennas can define a field of view for ranging. As an example, the field of view can span 120 degrees. Such regulation can allow a determination of which direction a user is pointing a device relative to one or more other nearby devices. The field of view may include any one or more of pitch, yaw, or roll angles.

UWB circuitry 1215 can communicate with an always-on processor (AOP) 1230, which can perform further processing using information from UWB messages. For example, AOP 1230 can perform the ranging calculations using timing data provided by UWB circuitry 1215. AOP 1230 and other circuits of the device can include dedicated circuitry and/or configurable circuitry, e.g., via firmware or other software.

As shown, mobile device 1200 also includes Bluetooth (BT)/Wi-Fi antenna 1220 for communicating data with other devices. Bluetooth (BT)/Wi-Fi antenna 1220 is connected to BT/Wi-Fi circuitry 1225 for analyzing detected signals from BT/Wi-Fi antenna 1220. For example, BT/Wi-Fi circuitry 1225 can parse messages to obtain data (e.g., an authentication tag), which can be sent on to AOP 1230. In some embodiments, AOP 1230 can perform authentication using an authentication tag. Thus, AOP 1230 can store or retrieve a list of authentication tags for which to compare a received tag against, as part of an authentication process. In some implementations, such functionality could be achieved by BT/Wi-Fi circuitry 1225.

In other embodiments, UWB circuitry 1215 and BT/Wi-Fi circuitry 1225 can alternatively or in addition be connected to application processor 1240, which can perform similar functionality as AOP 1230. Application processor 1240 typically requires more power than AOP 1230, and thus power can be saved by AOP 1230 handling certain functionality, so that application processor 1240 can remain in a sleep state, e.g., an off state. As an example, application processor 1240 can be used for communicating audio or video using BT/Wi-Fi, while AOP 1230 can coordinate transmission of such content and communication between UWB circuitry 1215 and BT/Wi-Fi circuitry 1225. For instance, AOP 1230 can coordinate timing of UWB messages relative to BT advertisements.

Coordination by AOP 1230 can have various benefits. For example, a first user of a sending device may want share content with another user, and thus ranging may be desired with a receiving device of this other user. However, if many people are in the same room, the sending device may need to distinguish a particular device among the multiple devices in the room, and potentially determine which device the sending device is pointing to. Such functionality can be provided by AOP 1230. In addition, it is not desirable to wake up the application processor of every other device in the room, and thus the AOPs of the other devices can perform some processing of the messages and determine that the destination address is for a different device.

To perform ranging, BT/Wi-Fi circuitry 1225 can analyze an advertisement signal from another device to determine that the other device wants to perform ranging, e.g., as part of a process for sharing content. BT/Wi-Fi circuitry 1225 can communicate this notification to AOP 1230, which can schedule UWB circuitry 1215 to be ready to detect UWB messages from the other device.

For the device initiating ranging, its AOP can perform the ranging calculations. Further, the AOP can monitor changes in distance between the other devices. For example, AOP 1230 can compare the distance to a threshold value and provide an alert when the distance exceeds a threshold, or potentially provide a reminder when the two devices become sufficiently close. An example of the former might be when a parent wants to be alerted when a child (and presumably the child's device) is too far away. An example of the latter might be when a person wants to be reminded to bring up something when talking to a user of the other device. Such monitoring by the AOP can reduce power consumption by the application processor.

VII. Sharing Data Based on Range

A user of one mobile device may want to share data (e.g., a video or audio file) to another user. The user could attach a file to an email and send, but this can be slow and expose the data to a network. Thus, it may be advantageous to send the data directly to the other device, e.g., using Bluetooth or Wi-Fi direct (also called peer mode or ad-hoc mode), or at least only through a local access point/router. For example, the user's device can detect other nearby devices and display them as options for sharing the data.

Sharing data in this manner can be problematic when there are multiple devices nearby. For example, if two people (i.e., sender and receiver) are in a crowd, the discovery process can identify multiple devices. If multiple devices are displayed as options, their icons can be difficult to display on a single screen, thereby causing frustration to a user, who wants to select a friend's device quickly. It is possible to only display icons of other devices that show up in a contact list of the sending device. This can limit the number of devices shown as options for sending the data. However, such a requirement can limit the ability to share data to a new person. In addition, the requirement of being in the contact list does not address when a user is among many friends, coworkers, etc., where all or many of them are in the contact list. Embodiments can use ranging to facilitate this process.

Figure 13:
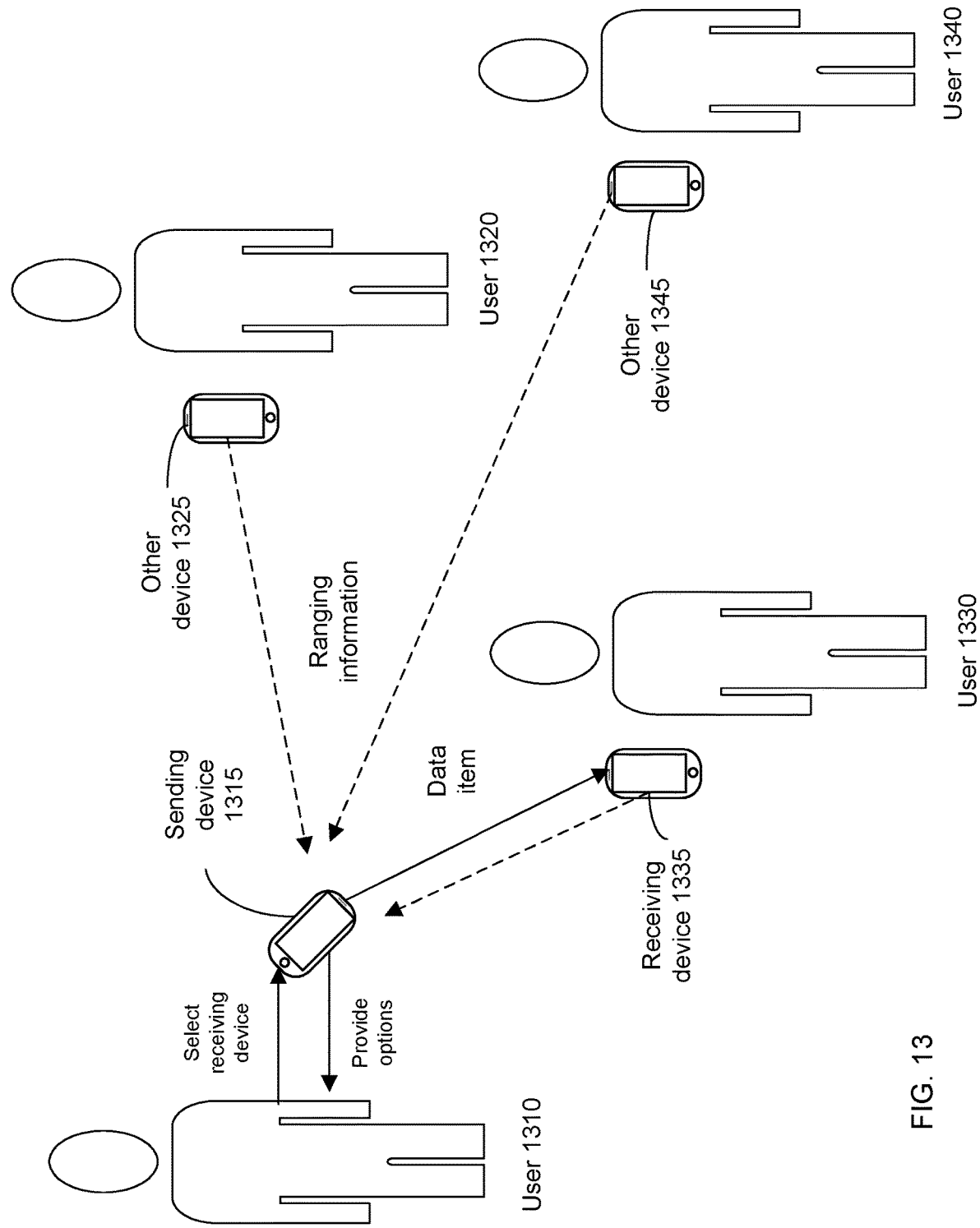
FIG. 13 shows an example sharing scenario of a mobile device using ranging to facilitate sharing a data item with another device according to embodiments of the present disclosure.

FIG. 13 shows an example sharing scenario of a mobile device using ranging to facilitate sharing a data item with another device according to embodiments of the present disclosure. The data item could be various things, e.g., a contact, an audio file, an image, a video file, a deep link to a location in an application installed on both devices, and the like. A sharing session can be initiated by user 1310 using a sending device 1315.

A user 1310 can initiate the sharing session on sending device 1315 in a variety of ways. For example, user 1310 can select a data item, and then select a sharing option (e.g., a button on a graphical user interface (GUI)) to share the data item. The selection of the sharing option can begin a sharing process, e.g., as described in FIGS. 1-4.

Advertisements can be sent from the devices and used for authentication. Sending device 1315 can authenticate each of devices 1325, 1335, and 1345. Once authenticated, sending device 1315 can perform a ranging operation with each of the devices, which can respond with ranging information, as depicted.

Sending device 1315 can use the range information to determine distance information, e.g., relative positions of the other devices. For example, if the sending device 1315 includes multiple antennas (e.g., 3), sending device 1315 can determine a position of each of the devices on a 2D grid relative to sending device 1315. As another example, sending device 1315 can determine a single distance value to each of the devices, where devices may be sorted in a list by this distance. Sending device 1315 can use the distance information for configuring a display on a screen of sending device 1315. For instance, the position can be used to determine where to display an icon corresponding to mobile device 1325, e.g., which position in a list, which position in a 2D grid, or in which cluster of 1D, 2D, or 3D distance/position ranges to display the icon.

User 1310 can select which device to send the data item. As shown, device 1335 is selected. The selection can be made in various ways, e.g., by touching an icon representing receiving device 1335, which can be a picture of user 1330. In other embodiments, user 1310 can point sending device 1315 at receiving device 1335 to achieve the selection. For instance, the device that is along a central axis pointing from the sending device can be automatically selected as the recipient of the data item. In this manner, user 1310 can easily see available devices and select the desired device.

In some embodiments, the users can control which other devices can discover them and perform ranging, or whether the device will allow sharing. For example, a user can restrict such operations to those in the contact list or a subset of those in the contact list. In addition, as described herein, the authentication can occur without providing private information in the clear, e.g., any such private data may be encrypted or otherwise obfuscated. For example, hashes of identifiers can be used as a first authentication tag, or public certificates and/or digital signatures can be used. For instance, an authentication server can issue the hashes, digital signatures, public certificates, etc., so that a device can match an authentication tag to a device that has been previously encountered (e.g., in a contact list) or at least know that the device has been registered and/or authenticated by the authentication server. The authentication server can provide authentication tags for each device in a contact list. As another example, such authentication tags (e.g., hashes) can be generated by a first device (e.g., at time of registration) and sent to the authentication server, which can distribute them to other devices that have the first device or related identifier in their contact list.

VIII. Example Device

Figure 14:
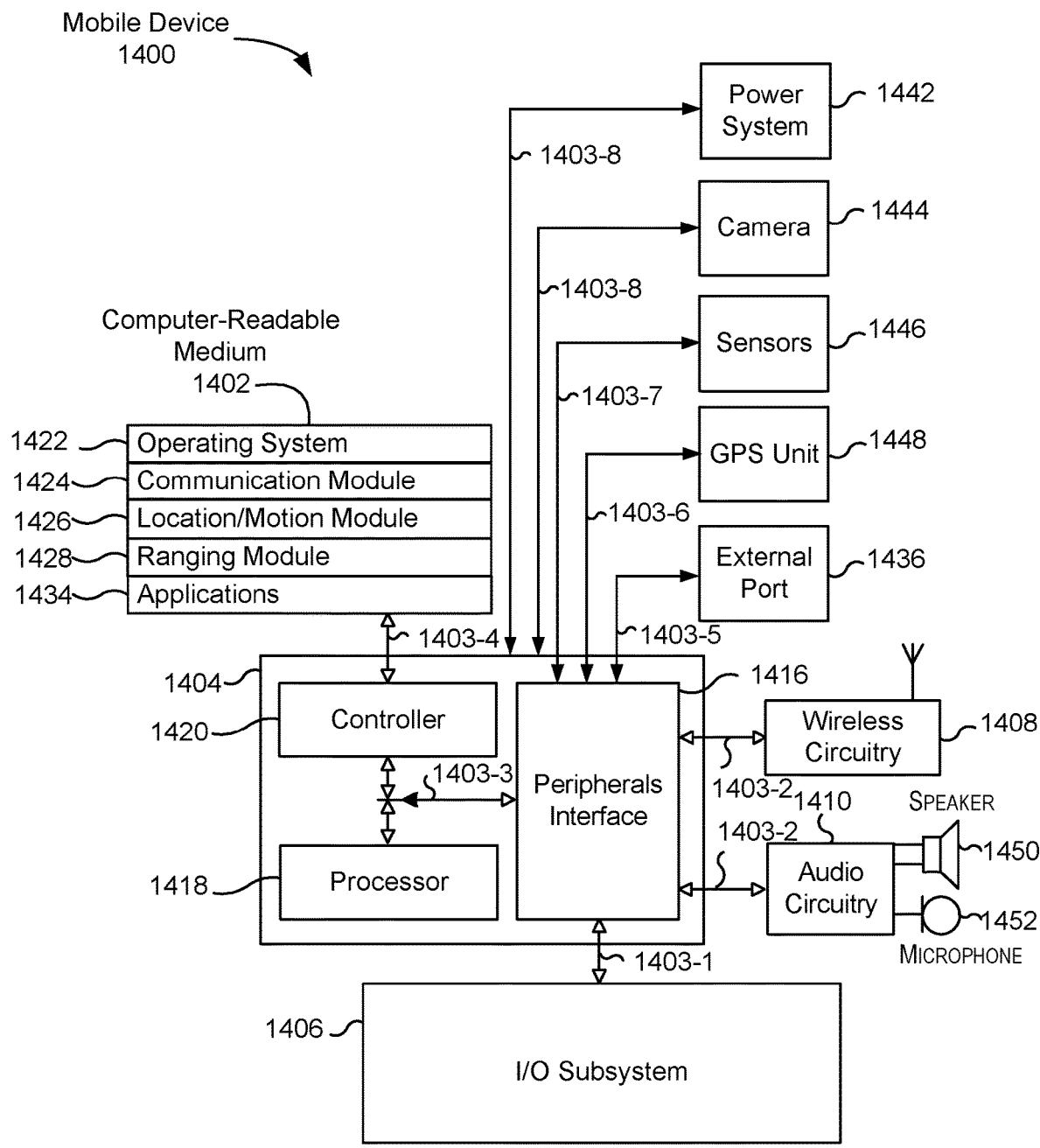
FIG. 14 is block diagram of an example device according to embodiments of the present disclosure.

FIG. 14 is a block diagram of an example electronic device 1400. Device 1400 generally includes computer-readable medium 1402, a processing system 1404, an Input/Output (I/O) subsystem 1406, wireless circuitry 1408, and audio circuitry 1410 including speaker 1412 and microphone 1414. These components may be coupled by one or more communication buses or signal lines 1403. Device 1400 can be any portable electronic device, including a handheld computer, a tablet computer, a mobile phone, laptop computer, tablet device, media player, personal digital assistant (PDA), a key fob, a car key, an access card, a multifunction device, a mobile phone, a portable gaming device, a headset, or the like, including a combination of two or more of these items.

It should be apparent that the architecture shown in FIG. 14 is only one example of an architecture for device 1400, and that device 1400 can have more or fewer components than shown, or a different configuration of components. The various components shown in FIG. 14 can be implemented in hardware, software, or a combination of both hardware and software, including one or more signal processing and/or application specific integrated circuits.

Wireless circuitry 1408 is used to send and receive information over a wireless link or network to one or more other devices' conventional circuitry such as an antenna system, a radio frequency (RF) transceiver, one or more amplifiers, a tuner, one or more oscillators, a digital signal processor, a CODEC chipset, memory, etc. Wireless circuitry 1408 can use various protocols, e.g., as described herein. In various embodiments, wireless circuitry 1408 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), Long-term Evolution (LTE)-Advanced, Wi-Fi (such as Institute of Electrical and Electronics Engineers (IEEE) 802.11a, IEEE 802.11b, IEEE 802.11g and/or IEEE 802.11n), Bluetooth, Wi-MAX, voice over Internet Protocol (VoW), near field communication protocol (NFC), a protocol for email, instant messaging, and/or a short message service (SMS), or any other suitable communication protocol, including communication protocols not yet developed as of the filing date of this document.

Wireless circuitry 1408 is coupled to processing system 1404 via peripherals interface 1416. Peripherals interface 1416 can include conventional components for establishing and maintaining communication between peripherals and processing system 1404. Voice and data information received by wireless circuitry 1408 (e.g., in speech recognition or voice command applications) is sent to one or more processors 1418 via peripherals interface 1416. One or more processors 1418 are configurable to process various data formats for one or more application programs 1434 stored on medium 1402.

Peripherals interface 1416 couple the input and output peripherals of device 1400 to the one or more processors 1418 and computer-readable medium 1402. One or more processors 1418 communicate with computer-readable medium 1402 via a controller 1420. Computer-readable medium 1402 can be any device or medium that can store code and/or data for use by one or more processors 1418. Computer-readable medium 1402 can include a memory hierarchy, including cache, main memory, and secondary memory. The memory hierarchy can be implemented using any combination of RAM (e.g., Standard Random Access Memory (SRAM), Dynamic Random Access Memory (DRAM), Double Data Random Access Memory (DDRAM), Read only Memory (ROM), FLASH, magnetic and/or optical storage devices, such as disk drives, magnetic tape, CDs (compact disks) and DVDs (digital video discs). In some embodiments, peripherals interface 1416, one or more processors 1418, and controller 1420 can be implemented on a single chip, such as processing system 1404. In some other embodiments, they can be implemented on separate chips.

Processor(s) 1418 can include hardware and/or software elements that perform one or more processing functions, such as mathematical operations, logical operations, data manipulation operations, data transfer operations, controlling the reception of user input, controlling output of information to users, or the like. Processor(s) 1418 can be embodied as one or more hardware processors, microprocessors, microcontrollers; field programmable gate arrays (FPGAs), application-specified integrated circuits (ASICs), or the like.

Device 1400 also includes a power system 1442 for powering the various hardware components. Power system 1442 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 1400 includes a camera 1444. In some embodiments, device 1400 includes sensors 1446. Sensors can include accelerometers, compass, gyrometer, pressure sensors, audio sensors, light sensors, barometers, and the like. Sensors 1446 can be used to sense location aspects, such as auditory or light signatures of a location.

In some embodiments, device 1400 can include a GPS receiver, sometimes referred to as a GPS unit 1448. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1418 run various software components stored in medium 1402 to perform various functions for device 1400. In some embodiments, the software components include an operating system 1422, a communication module 1424 (or set of instructions), a location module 1426 (or set of instructions), a ranging module 1428 that is used as part of ranging operation described herein, and other application programs 1434 (or set of instructions).

Operating system 1422 can be any suitable operating system, including iOS, Mac OS, Darwin, Quatros Real-Time Operating System (RTXC), LINUX, UNIX, OS X, WINDOWS, or an embedded operating system such as VxWorks. The operating system can include various procedures, sets of instructions, software components, and/or drivers for controlling and managing general system tasks (e.g., memory management, storage device control, power management, etc.) and facilitates communication between various hardware and software components.

Communication module 1424 facilitates communication with other devices over one or more external ports 1436 or via wireless circuitry 1408 and includes various software components for handling data received from wireless circuitry 1408 and/or external port 1436. External port 1436 (e.g., universal serial bus (USB), FireWire, Lightning connector, 60-pin connector, etc.) is adapted for coupling directly to other devices or indirectly over a network (e.g., the Internet, wireless LAN, etc.).

Location/motion module 1426 can assist in determining the current position (e.g., coordinates or other geographic location identifiers) and motion of device 1400. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 1426 receives data from GPS unit 1448 and analyzes the signals to determine the current position of the mobile device. In some embodiments, location/motion module 1426 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 1408 and is passed to location/motion module 1426. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 1400 based on the position coordinates of the corresponding transmitters. Regardless of the specific location technology used, location/motion module 1426 receives information from which a location fix can be derived, interprets that information, and returns location information, such as geographic coordinates, latitude/longitude, or other location fix data Ranging module 1428 can send/receive ranging messages to/from an antenna, e.g., connected to wireless circuitry 1408. The messages can be used for various purposes, e.g., to identify a sending antenna of a device, determine timestamps of messages to determine a distance of mobile device 1400 from another device. Ranging module 1428 can exist on various processors of the device, e.g., an always-on processor (AOP), a UWB chip, and/or an application processor. For example, parts of ranging module 1428 can determine a distance on an AOP, and another part of the ranging module can interact with a sharing module, e.g., to display a position of the other device on a screen in order for a user to select the other device to share a data item. Ranging module 1428 can also interact with a reminder module that can provide an alert based on a distance from another mobile device.

The one or more applications 1434 on device 1400 can include any applications installed on the device 1400, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or advanced audio codec (AAC) files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations, and the like) on a display surface. In another example, a timer module can be a software timer. The timer module can also be implemented in hardware. The time module can maintain various timers for any number of events.

I/O subsystem 1406 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1406 can include a display and user input devices such as a keyboard, mouse, and/or trackpad. In some embodiments, I/O subsystem 1406 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 1402) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 1406 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1400 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

As described above, one aspect of the present technology is the gathering, sharing, and use of data, including an authentication tag and data from which the tag is derived. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to authenticate another device, and vice versa to control which devices ranging operations may be performed. Further, other uses for personal information data that benefit the user are also contemplated by the present disclosure. For instance, health and fitness data may be shared to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sharing content and performing ranging, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Although the present disclosure has been described with respect to specific embodiments, it will be appreciated that the disclosure is intended to cover all modifications and equivalents within the scope of the following claims.

All patents, patent applications, publications, and descriptions mentioned herein are incorporated by reference in their entirety for all purposes. None is admitted to be prior art.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method comprising performing, by a beacon device:
defining a ranging round including an initial timeslot, a plurality of response slots for discovering and performing ranging with any mobile device in a vicinity of the beacon device, and a duration of each response timeslot, wherein each of the plurality of response slots is non-overlapping in time with other of the plurality of response slots;
during the initial timeslot, broadcasting a ranging request at a request time, and wherein the ranging request includes a beacon identifier of the beacon device;
during a first response slot of the plurality of response slots, receiving a first response message at a first response time, the first response message comprising a first identifier of a first mobile device that transmitted the first response message;
during the first response slot, transmitting a first acknowledgement message comprising the beacon identifier, the first identifier of the first mobile device, and a first time of flight information associated with a first distance between the beacon device and the first mobile device, the first time of flight information determined using the first response time;
during a second response slot of the plurality of response slots, receiving a second response message at a second response time, the second response message comprising the beacon identifier, a second identifier of a second mobile device that transmitted the second response message; and
during the second response slot, transmitting a second acknowledgement message comprising the second identifier of the second mobile device and second time of flight information indicating a second distance between the beacon device and the second mobile device, the second time of flight information determined using the second response time.

2. The method of claim 1, further comprising:
transmitting an advertising packet using a first wireless protocol at a first time;
calculating a second time comprising an elapsed time from the first time until a ranging request is to be transmitted using a second wireless protocol; and
transmitting, using the second wireless protocol, an acquisition packet containing the calculated second time, the acquisition packet being transmitted at a predetermined time period after transmitting the advertising packet.

3. The method of claim 1, further comprising calculating a first reply time as a time difference between receipt of the first response message and transmission of the first acknowledgement message, wherein the first time of flight information comprises the first response time minus the first reply time.

4. The method of claim 1, further comprising calculating a second reply time as a time difference between receipt of the second response message and transmission of the second acknowledgement message, wherein the second time of flight information comprises the second response time minus the second reply time.

5. The method of claim 1, calculating a first round trip time as a time difference between the request time and the first response time.

6. The method of claim 1, further comprising during a first time slot of the plurality of response slots, receiving a first range message comprising a first distance calculated by the first mobile device.

7. The method of claim 1, further comprising transmitting information to the first mobile device based at least in part on the first distance between the beacon device and the first mobile device.

8. The method of claim 1, wherein the ranging request includes information on a number of available slots.

9. The method of claim 1, further comprising dynamically changing a number of the plurality of response slots based at least in part on collisions detected during the response slots.

10. The method of claim 1, further comprising:
receiving a third response message at a third response time when the first acknowledgement message is not received by the first mobile device, the third response message comprising an identifier of the first mobile device;
calculating a third round trip time as a time difference between the request time and a third response time;
calculating a third reply time for processing the third round trip time and generating a third acknowledgement message; and
transmitting, the third acknowledgement message comprising the identifier of the first mobile device and third time information indicating the first distance between the beacon device and the first mobile device, the third time information determined using the third response time.

11. The method of claim 1, wherein at least one of a number of the plurality of response slots and the duration of each response timeslot are based on a number of mobile devices in the ranging round.

12. The method of claim 1, wherein at least one of a number of the plurality of response slots and the duration of each response timeslot are determined by a certain protocol used for ranging.

13. The method of claim 1, wherein parameters for the ranging round are incorporated into a ranging request for transmission to the mobile devices.

14. The method of claim 1, wherein parameters for the ranging round are stored on the mobile device.

15. A non-transitory computer-readable medium storing a plurality of instructions that, when executed by one or more processors of a computing device, cause the one or more processors to perform operations comprising:
defining a ranging round including an initial timeslot, a plurality of response slots for discovering and performing ranging with any mobile device in a vicinity of the computing device, and a duration of each response timeslot, wherein each of the plurality of response slots is non-overlapping in time with other of the plurality of response slots;
during the initial timeslot, broadcasting a ranging request at a request time, and wherein the ranging request includes a beacon identifier of the computing device;
during a first response slot of the plurality of response slots, receiving a first response message at a first response time, the first response message comprising a first identifier of a first mobile device that transmitted the first response message;
during the first response slot, transmitting a first acknowledgement message comprising the beacon identifier, the first identifier of the first mobile device, and a first time of flight information associated with a first distance between the computing device and the first mobile device, the first time of flight information determined using the first response time;
during a second response slot of the plurality of response slots, receiving a second response message at a second response time, the second response message comprising the beacon identifier, a second identifier of a second mobile device that transmitted the second response message; and
during the second response slot, transmitting a second acknowledgement message comprising the second identifier of the second mobile device and second time of flight information indicating a second distance between the computing device and the second mobile device, the second time of flight information determined using the second response time.

16. The non-transitory computer readable medium of claim 15, wherein the plurality of instructions that, when executed by the one or more processors of the computing device, cause the one or more processors to further perform operations comprising:
transmitting an advertising packet using a first wireless protocol at a first time;
calculating a second time comprising an elapsed time from the first time until a ranging request is to be transmitted using a second wireless protocol; and
transmitting, using the second wireless protocol, an acquisition packet containing the calculated second time, the acquisition packet being transmitted at a predetermined time period after transmitting the advertising packet.

17. A method comprising performing, by a first mobile device:
receiving a broadcast ranging request at a request time, the broadcast ranging request comprising a beacon identifier of a beacon device, wherein the broadcast ranging request is associated with a ranging round having an initial timeslot and a plurality of response slots, wherein each of the plurality of response slots is non-overlapping in time with other of the plurality of response slots;
selecting a first response slot of the plurality of response slots, wherein the selecting the first response slot comprises choosing the first response slot randomly or pseudo-randomly;
transmitting a first response message at a first response time, the first response message comprising a first identifier of the first mobile device;
receiving a first acknowledgement message comprising the first identifier of the first mobile device and a first time of flight information associated with a first distance between the beacon device and the first mobile device; and
calculating a first distance between the first mobile device and the beacon device using the first time of flight information.

18. The method of claim 17, further comprising:
receiving an advertising packet using a first wireless protocol at a first time;
determining a first window for receiving an acquisition packet using a second wireless protocol based at least in part in the first time, the first time based on receiving the advertising packet;
receiving, using the second wireless protocol, the acquisition packet containing a calculated time for receiving a poll message, the acquisition packet being transmitted at a predetermined time period after transmitting the advertising packet;

calculating a second window for receiving the poll message based at least in part on a second time and the calculated time, the second time based on receiving the acquisition packet; and receiving the poll message during the second window.

19. The method of claim 17, wherein the first time of flight information is calculated based at least in part on a first time difference between a transmission time of the first response message and a reception time of the first acknowledgement message minus a delay time, the delay time calculated as a second time difference between receipt of the first response message and transmission of the first acknowledgment message.

20. The method of claim 17, wherein the first time of flight information is calculated by the beacon device.

21. The method of claim 17, further comprising receiving information based at least in part on the first distance between the beacon device and the first mobile device.

22. The method of claim 17, wherein the broadcast ranging request includes information on a number of available slots.

23. The method of claim 17, further comprising dynamically changing a number of the plurality of response slots based at least in part on collisions detected during the plurality of response slots.

24. The method of claim 17, further comprising:
transmitting a third response message at a third response time when the first acknowledgement message is not received by the first mobile device, the third response message comprising an identifier of the first mobile device; and
receiving, a third acknowledgement message comprising the identifier of the first mobile device and third time information indicating the first distance between the beacon device and the first mobile device, the third time information determined using the third response time.

25. A mobile device, comprising:
one or more processors; and
a memory storing a plurality of instructions that when executed by the one or more processors cause the one or more processors to perform operations comprising:
receiving a broadcast ranging request at a request time, the broadcast ranging request comprising a beacon identifier of a beacon device, wherein the broadcast ranging request is associated with a ranging round having an initial timeslot and a plurality of response slots, wherein each of the plurality of response slots is non- overlapping in time with other of the plurality of response slots;
selecting a first response slot of the plurality of response slots, wherein the selecting the first response slot comprises choosing the first response slot randomly or pseudo-randomly;
transmitting a first response message at a first response time, the first response message comprising a first identifier of the first mobile device;
receiving a first acknowledgement message comprising the first identifier of the first mobile device and a first time of flight information associated with a first distance between the beacon device and the first mobile device; and
calculating a first distance between the first mobile device and the beacon device using the first time of flight information.

26. A non-transitory computer-readable medium, storing instructions that when executed by one or more processors of a mobile device cause the one or more processors to perform operations comprising:
receiving a broadcast ranging request at a request time, the broadcast ranging request comprising a beacon identifier of a beacon device, wherein the broadcast ranging request is associated with a ranging round having an initial timeslot and a plurality of response slots, wherein each of the plurality of response slots is non- overlapping in time with other of the plurality of response slots;
selecting a first response slot of the plurality of response slots, wherein the selecting the first response slot comprises choosing the first response slot randomly or pseudo-randomly;
transmitting a first response message at a first response time, the first response message comprising a first identifier of the first mobile device;
receiving a first acknowledgement message comprising the first identifier of the first mobile device and a first time of flight information associated with a first distance between the beacon device and the first mobile device; and
calculating a first distance between the first mobile device and the beacon device using the first time of flight information.

* * * * *